US012703131B2

(12) United States Patent
Smith et al.

(10) Patent No.: US 12,703,131 B2
(45) **Date of Patent: *Aug. 11, 2026**

(54) EXPANDED POLYMER PELLETS

(71) Applicant: adidas AG, Herzogenaurach (DE)

(72) Inventors: Paul Leonard Michael Smith, Herzogenaurach (DE); Jan Hill, Herzogenaurach (DE); Angus Wardlaw, Herzogenaurach (DE); Daniel Stephen Price, Herzogenaurach (VN); James Tarrier, Herzogenaurach (DE)

(73) Assignee: adidas AG, Herzogenaurach (DE)

( * ) Notice: Subject to any disclaimer, the term of this patent is extended or adjusted under 35 U.S.C. 154(b) by 36 days.

This patent is subject to a terminal disclaimer.

(21) Appl. No.: 18/735,533

(22) Filed: Jun. 6, 2024

(65) Prior Publication Data

US 2024/0326302 A1 Oct. 3, 2024

Related U.S. Application Data

(60) Continuation of application No. 17/004,430, filed on Aug. 27, 2020, now Pat. No. 12,036,707, which is a (Continued)

(30) Foreign Application Priority Data

Aug. 26, 2014 (DE) .................... 10 2014 216 992.5

(51) Int. Cl.

*B29C 44/34* (2006.01)
*A43B 13/04* (2006.01)

(Continued)

(52) U.S. Cl.

CPC .......... *B29C 44/3461* (2013.01); *A43B 13/04* (2013.01); *A43B 13/187* (2013.01);

(Continued)

(58) Field of Classification Search

CPC ........... B29C 45/0001; B29C 45/0053; B29C 2045/0091; B29C 44/02; B29C 44/341;

(Continued)

(56) References Cited

U.S. PATENT DOCUMENTS 4,026,834 A 5/1977 Cordes et al.
4,028,287 A 6/1977 Sato et al.

(Continued)

FOREIGN PATENT DOCUMENTS

CN 1314433 A 9/2001
CN 1440435 A 9/2003

(Continued)

OTHER PUBLICATIONS

English Translation for JP 2004-1401 (Year: 2004).*

(Continued)

*Primary Examiner* — Seyed Masoud Malekzadeh
(74) *Attorney, Agent, or Firm* — Kilpatrick Townsend & Stockton LLP

(57) ABSTRACT

The invention refers to a method for producing expanded polymer pellets, which comprises the following steps: melting a polymer comprising a polyamide; adding at least one blowing agent; expanding the melt through at least one die for producing an expanded polymer; and pelletizing the expanded polymer. The invention further concerns polymer pellets produced with the method as well as their use, e.g. for the production of cushioning elements for sports apparel, such as for producing soles or parts of soles of sports shoes. A further aspect of the invention concerns a method for the manufacture of molded components, comprising loading pellets of an expanded polymer material into a mold, and connecting the pellets by providing heat energy, wherein the (Continued)

expanded polymer material of the pellets or beads comprises a chain extender. The molded components may be used in broad ranges of application.

19 Claims, 12 Drawing Sheets

Related U.S. Application Data division of application No. 15/507,054, filed as application No. PCT/EP2015/057909 on Apr. 10, 2015, now Pat. No. 10,759,096.

(51) Int. Cl.

| | |
|---|---|
| ***A43B 13/18*** | (2006.01) |
| ***B29B 9/06*** | (2006.01) |
| ***B29B 9/10*** | (2006.01) |
| ***B29B 9/12*** | (2006.01) |
| ***B29C 44/02*** | (2006.01) |
| ***B29C 45/00*** | (2006.01) |
| ***C08G 81/02*** | (2006.01) |
| ***C08J 9/12*** | (2006.01) |
| ***C08J 9/14*** | (2006.01) |
| ***C08J 9/16*** | (2006.01) |
| ***C08J 9/18*** | (2006.01) |
| ***C08J 9/232*** | (2006.01) |
| ***C08J 9/36*** | (2006.01) |
| ***E04B 1/84*** | (2006.01) |
| *B29K 77/00* | (2006.01) |
| *B29K 105/04* | (2006.01) |
| *B29L 31/00* | (2006.01) |
| *B29L 31/50* | (2006.01) |
| *E04B 1/74* | (2006.01) |
| *G10K 11/162* | (2006.01) |

(52) U.S. Cl.

CPC ................ *B29B 9/065* (2013.01); *B29B 9/10* (2013.01); *B29B 9/12* (2013.01); *B29C 44/02* (2013.01); *B29C 45/0001* (2013.01); *B29C 45/0053* (2013.01); *C08G 81/027* (2013.01); *C08G 81/028* (2013.01); *C08J 9/122* (2013.01); *C08J 9/127* (2013.01); *C08J 9/142* (2013.01); *C08J 9/16* (2013.01); *C08J 9/18* (2013.01); *C08J 9/232* (2013.01); *C08J 9/36* (2013.01); *E04B 1/84* (2013.01); *B29B 2009/125* (2013.01); *B29C 2045/0091* (2013.01); *B29C 2045/0093* (2013.01); *B29K 2077/00* (2013.01); *B29K 2105/04* (2013.01); *B29K 2995/0002* (2013.01); *B29L 2031/504* (2013.01); *B29L 2031/712* (2013.01); *C08J 2201/03* (2013.01); *C08J 2201/036* (2013.01); *C08J 2201/038* (2013.01); *C08J 2203/06* (2013.01); *C08J 2203/08* (2013.01); *C08J 2203/12* (2013.01); *C08J 2203/18* (2013.01); *C08J 2203/182* (2013.01); *C08J 2205/05* (2013.01); *C08J 2359/00* (2013.01); *C08J 2359/02* (2013.01); *C08J 2367/00* (2013.01); *C08J 2367/02* (2013.01); *C08J 2367/04* (2013.01); *C08J 2371/00* (2013.01); *C08J 2377/00* (2013.01); *C08J 2377/02* (2013.01); *C08J 2377/06* (2013.01); *E04B 2001/742* (2013.01); *G10K 11/162* (2013.01)

(58) Field of Classification Search

CPC ....... B29C 44/3461; B29B 9/06; B29B 9/065; B29B 9/10; B29B 9/12; B29B 2009/125

See application file for complete search history.

(56) References Cited

U.S. PATENT DOCUMENTS

| | | | | |
|---|---|---|---|---|
| 4,525,486 | A | 6/1985 | Kobayashi et al. | |
| 4,988,740 | A | 1/1991 | Walter et al. | |
| 5,502,106 | A | 3/1996 | LaFleur | |
| 6,039,085 | A | 3/2000 | Hsich | |
| 6,110,983 | A | 8/2000 | Tokoro et al. | |
| 6,339,109 | B1 | 1/2002 | Day | |
| 6,984,694 | B2 | 1/2006 | Blasius, Jr. et al. | |
| 7,897,077 | B2 | 3/2011 | Seibring et al. | |
| 7,994,231 | B2 | 8/2011 | Jacobs et al. | |
| 8,268,901 | B2 | 9/2012 | Britton et al. | |
| 8,372,512 | B2 | 2/2013 | Hirai et al. | |
| 8,535,585 | B2 | 9/2013 | Casalini et al. | |
| D709,680 | S | 7/2014 | Herath | |
| D740,003 | S | 10/2015 | Herath | |
| D740,004 | S | 10/2015 | Hoellmueller et al. | |
| 9,249,270 | B2 | 2/2016 | Sampath et al. | |
| D758,056 | S | 6/2016 | Galway et al. | |
| D776,410 | S | 1/2017 | Galway et al. | |
| D783,264 | S | 4/2017 | Hoellmueller et al. | |
| 9,610,746 | B2 | 4/2017 | Wardlaw et al. | |
| 9,781,970 | B2 | 10/2017 | Wardlaw et al. | |
| 9,781,974 | B2 | 10/2017 | Reinhardt | |
| 9,788,598 | B2 | 10/2017 | Reinhardt | |
| 9,788,606 | B2 | 10/2017 | Reinhardt | |
| 9,795,186 | B2 | 10/2017 | Reinhardt et al. | |
| 9,820,528 | B2 | 11/2017 | Reinhardt et al. | |
| 9,849,645 | B2 | 12/2017 | Wardlaw et al. | |
| 9,930,928 | B2 | 4/2018 | Whiteman et al. | |
| 9,968,157 | B2 | 5/2018 | Wardlaw et al. | |
| 10,005,218 | B2 | 6/2018 | Rudolph et al. | |
| 10,039,342 | B2 | 8/2018 | Reinhardt et al. | |
| D828,686 | S | 9/2018 | Hoellmueller et al. | |
| D828,991 | S | 9/2018 | Herath | |
| D840,136 | S | 2/2019 | Herath et al. | |
| D840,137 | S | 2/2019 | Herath et al. | |
| 10,259,183 | B2 | 4/2019 | Wardlaw et al. | |
| 10,279,516 | B2 | 5/2019 | Daeschlein et al. | |
| D851,889 | S | 6/2019 | Dobson et al. | |
| D852,475 | S | 7/2019 | Hoellmueller et al. | |
| D853,691 | S | 7/2019 | Coonrod et al. | |
| D853,699 | S | 7/2019 | Coonrod et al. | |
| D855,297 | S | 8/2019 | Motoki | |
| D873,543 | S | 1/2020 | Coonrod et al. | |
| D875,359 | S | 2/2020 | Dobson et al. | |
| D882,927 | S | 5/2020 | Bruns et al. | |
| D882,928 | S | 5/2020 | Bruns et al. | |
| D889,810 | S | 7/2020 | Hoellmueller et al. | |
| D891,051 | S | 7/2020 | Smith et al. | |
| 10,759,096 | B2 | 9/2020 | Smith et al. | |
| 11,117,294 | B2 | 9/2021 | Holmes et al. | |
| 12,036,707 | B2 | 7/2024 | Smith et al. | |
| 2005/0156344 | A1* | 7/2005 | Dietzen | B29C 48/00 521/50 |
| 2007/0112082 | A1* | 5/2007 | Hahn | B29B 9/065 521/60 |
| 2009/0051061 | A1 | 2/2009 | Seibring et al. | |
| 2009/0108480 | A1* | 4/2009 | Schmaus | B29C 44/3461 264/12 |
| 2010/0190877 | A1* | 7/2010 | Schips | B29C 44/3461 521/59 |
| 2010/0239834 | A1 | 9/2010 | Dietrich et al. | |
| 2011/0008608 | A1* | 1/2011 | Bellin | B32B 5/18 428/305.5 |
| 2011/0294910 | A1* | 12/2011 | Kriha | B29B 9/065 521/59 |
| 2012/0007267 | A1 | 1/2012 | Pawloski et al. | |
| 2012/0010307 | A1 | 1/2012 | Pawloski et al. | |
| 2012/0041086 | A1 | 2/2012 | Sampath et al. | |
| 2012/0100289 | A1 | 4/2012 | Egan et al. | |
| 2012/0280419 | A1 | 11/2012 | Martin et al. | |
| 2013/0059938 | A1* | 3/2013 | Paetz-Lauter | C08J 9/34 428/407 |
| 2014/0151918 | A1 | 6/2014 | Hartmann | |
| 2014/0227506 | A1 | 8/2014 | Kuwabara et al. | |

(56) References Cited

U.S. PATENT DOCUMENTS

| | | | |
|---|---|---|---|
| 2015/0174808 | A1 | 6/2015 | Rudolph et al. |
| 2015/0353701 | A1* | 12/2015 | Urbanczyk .......... B29B 7/7461 521/146 |
| 2016/0037859 | A1 | 2/2016 | Smith et al. |
| 2016/0227876 | A1 | 8/2016 | Le et al. |
| 2016/0278481 | A1 | 9/2016 | Le et al. |
| 2016/0295955 | A1 | 10/2016 | Wardlaw et al. |
| 2016/0302508 | A1 | 10/2016 | Kormann et al. |
| 2016/0346627 | A1 | 12/2016 | Le et al. |
| 2017/0253710 | A1 | 9/2017 | Smith et al. |
| 2017/0259474 | A1 | 9/2017 | Holmes et al. |
| 2017/0340067 | A1 | 11/2017 | Dyckmans et al. |
| 2017/0341325 | A1 | 11/2017 | Le et al. |
| 2017/0341326 | A1 | 11/2017 | Holmes et al. |
| 2017/0341327 | A1 | 11/2017 | Le et al. |
| 2018/0000197 | A1 | 1/2018 | Wardlaw et al. |
| 2018/0035755 | A1 | 2/2018 | Reinhardt et al. |
| 2018/0154598 | A1 | 6/2018 | Kurtz et al. |
| 2018/0206591 | A1 | 7/2018 | Whiteman et al. |
| 2018/0235310 | A1 | 8/2018 | Wardlaw et al. |
| 2018/0290349 | A1 | 10/2018 | Kirupananthan et al. |
| 2018/0303198 | A1 | 10/2018 | Reinhardt et al. |
| 2019/0021435 | A1 | 1/2019 | Kormann et al. |
| 2019/0291371 | A1 | 9/2019 | Wardlaw et al. |
| 2020/0060383 | A1 | 2/2020 | Le et al. |
| 2020/0113260 | A1 | 4/2020 | Wardlaw et al. |
| 2020/0221820 | A1 | 7/2020 | Le et al. |
| 2020/0230905 | A1 | 7/2020 | Le et al. |
| 2020/0253328 | A1 | 8/2020 | Reinhardt et al. |
| 2020/0315290 | A1 | 10/2020 | Reinhardt et al. |

FOREIGN PATENT DOCUMENTS

| | | | |
|---|---|---|---|
| CN | 1890307 | A | 1/2007 |
| CN | 1318466 | | 5/2007 |
| CN | 101044196 | | 9/2007 |
| CN | 101611095 | | 12/2009 |
| CN | 101959942 | A | 1/2011 |
| CN | 103517648 | A | 1/2014 |
| CN | 103890066 | | 6/2014 |
| DE | 102004015093 | A1 | 10/2005 |
| EP | 256489 | | 2/1988 |
| EP | 0256489 | B1 | 6/1990 |
| JP | 60042432 | | 3/1985 |
| JP | H01-132642 | A | 5/1989 |
| JP | 04356541 | | 12/1992 |
| JP | 07179645 | | 7/1995 |
| JP | 2000086800 | | 3/2000 |
| JP | 2001-213991 | A | 8/2001 |
| JP | 2001253965 | | 9/2001 |
| JP | 2001329103 | | 11/2001 |
| JP | 2004001401 | A * | 1/2004 |
| JP | 2004-043681 | A | 2/2004 |
| JP | 2007514027 | | 5/2007 |
| JP | 2007516307 | | 6/2007 |
| JP | 2008-189805 | A | 8/2008 |
| JP | 2010111740 | | 5/2010 |
| JP | 2010525099 | | 7/2010 |
| JP | 2010184956 | | 8/2010 |
| JP | 2011105879 | | 6/2011 |
| JP | 2011213968 | | 10/2011 |
| JP | 2011225819 | | 11/2011 |
| JP | 2011256290 | | 12/2011 |
| JP | 2013517340 | | 5/2013 |
| JP | 2014-005445 | A | 1/2014 |
| JP | 2014151201 | | 8/2014 |
| JP | 2014158708 | | 9/2014 |
| JP | 2017525819 | | 9/2017 |
| WO | 2006045513 | | 5/2006 |
| WO | 2007/082838 | A1 | 7/2007 |
| WO | 2010/010010 | A1 | 1/2010 |
| WO | 2011/134996 | A1 | 11/2011 |
| WO | 2013148841 | | 10/2013 |
| WO | 2013153190 | | 10/2013 |
| WO | 2014198779 | A1 | 12/2014 |
| WO | 2016/030026 | A1 | 3/2016 |
| WO | 2016030333 | | 3/2016 |

OTHER PUBLICATIONS

Office Action, Japanese Patent Application No. 2024-034588, Feb. 4, 2025, 14 pages.
Korean Patent Application No. 10-2017-7008195, Office Action, Apr. 26, 2021, 19 pages.
U.S. Appl. No. 17/399,842, Notice of Allowance, Jan. 24, 2024, 8 pages.
Japanese Patent Application No. 2021-142602, Decision of Dismissal of Amendment, Nov. 7, 2023, 7 pages.
Japanese Patent Application No. 2021-142602, Decision of Rejection, Nov. 7, 2023, 2 pages.
U.S. Appl. No. 17/399,842, Final Office Action, Oct. 19, 2023, 10 pages.
European Patent Application No. 23190094.5, European Extended Search Report, Aug. 28, 2023, 12 pages.
U.S. Appl. No. 17/399,842, Non-Final Office Action, Mar. 22, 2023, 11 pages.
Office Action, European Patent Application No. 15713960.1, Feb. 26, 2021, 5 pages.
Office Action, Japanese Patent Application No. 2019-228251, Mar. 2, 2021, 9 pages.
U.S. Appl. No. 15/506,951 , Advisory Action, Mar. 25, 2021, 3 pages.
U.S. Appl. No. 15/506,951, Final Office Action, Nov. 13, 2020, 9 pages.
Office Action, German Patent Application No. 1020142169925, Feb. 5, 2020, 10 pages.
Office Action, European Patent Application No. 15756143.2, Sep. 4, 2020, 5 pages.
U.S. Appl. No. 15/506,951 , Non-Final Office Action, Apr. 2, 2020, 8 pages.
U.S. Appl. No. 15/507,054 , Advisory Action, Sep. 5, 2019, 6 pages.
U.S. Appl. No. 15/507,054 , Corrected Notice of Allowability, Jul. 29, 2020, 3 pages.
U.S. Appl. No. 15/507,054 , Final Office Action, May 29, 2019, 13 pages.
U.S. Appl. No. 15/507,054 , Non-Final Office Action, Dec. 19, 2018, 12 pages.
U.S. Appl. No. 15/507,054 , Non-Final Office Action, Dec. 2, 2019, 15 pages.
U.S. Appl. No. 15/507,054 , Notice of Allowance, Apr. 2, 2020, 8 pages.
U.S. Appl. No. 15/507,054 , Restriction Requirement, Sep. 10, 2018, 6 pages.
Office Action, Chinese Patent Application No. 201580045630.3, Nov. 2, 2018, 21 Pages.
Office Action, Japanese Patent Application No. 2017-511248, Sep. 4, 2018, 7 pages.
U.S. Appl. No. 16/918,014, filed Jul. 1, 2020, Unpublished.
U.S. Appl. No. 16/918,905, filed Jul. 1, 2020, Unpublished.
U.S. Appl. No. 16/918,241, filed Jul. 1, 2020, Unpublished.
U.S. Appl. No. 29/730,512, filed Apr. 6, 2020, Unpublished.
U.S. Appl. No. 29/697,489, filed Jul. 9, 2019, Unpublished.
Arkema, "Pebax Product Range Overview Sheet—General Characteristics," retrieved from the Internet at http://www.pebax.com/export/sites/pebax/.content/medias/downloads/literature/pebax_product_range_and_properties.pdf, Oct. 2, 2007, pp. 1-2.
Arkema Brochure, "Pebax—Polyether Block Amides," retrieved from the Internet at http://www.pebax.com/export/sites/pebax/.content/medias/downloads/literature/pebax-product-range-brochure.pdf, Aug. 26, 2009, pp. 1-14.
International Patent Application No. PCT/EP2015/057909, International Search Report and Written Opinion mailed Nov. 9, 2015, 18 pages.
International Patent Application No. PCT/EP2015/069368, International Search Report and Written Opinion mailed Dec. 23, 2015, 18 pages.

(56) References Cited

OTHER PUBLICATIONS

Japanese Application No. 2017-511251, Office Action mailed on Dec. 19, 2017, 9 pages (5 pages for the original document and 4 pages for the English translation).
Japanese Application No. 2017-511248, Office Action mailed on Feb. 20, 2018, 10 pages (6 pages for the original document and 4 pages for the English translation).
Chinese Patent Application No. 201580045630.3, Office Action mailed Nov. 2, 2018, 18 pages (11 pages of translation and 7 pages of original document).
Chinese Patent Application No. CN 201580045630.3, mailed Nov. 2, 2018, 21 pages (11 pages of English translation and 10 pages of Original document).
European Patent Application No. 15713960.1, Office Action, mailed Oct. 15, 2018, 5 pages.
Japanese Patent Application No. 2018-088909, Office Action mailed Mar. 26, 2019, 6 pages (machine English translation provided).
Xu et al., "Chain Extension of Polyamide 6 using Multifunctional Chain Extenders and Reactive Extrusion for Melt Foaming", European Polymer Journal, available at www.http://dx.doi.org/10.1016/j.eurpolymj.2017.09.012, 2017, 38 pages.
Yeh et al., "Carbon Dioxide-Blown Expanded Polyamide Bead Foams With Bimodal Cell Structure", Ind. Eng. Chem. Res. 2019, 58, 2019, pp. 2958-2969.
Decision to Grant, Japanese Patent Application No. 2017-511248, Jul. 16, 2019, 6 pages.
Office Action, Chinese Patent Application No. 201580045630.3, Aug. 27, 2019.
Office Action, Japanese Patent Application No. 2017-511248, Mar. 5, 2019, 4 pages.
Office Action, European Patent Application No. 15713960.1, Aug. 22, 2019, 6 pages.
Office Action, European Patent Application No. 15756143.2, Mar. 13, 2019, 6 pages.
Office Action, Chinese Patent Application No. 201580045604.0, Sep. 25, 2019, 7 pages.
U.S. Appl. No. 15/506,951 , Non-Final Office Action, Jun. 14, 2019, 10 pages.
Xintuo et al., "Effect of Crosslinkers and Chain Extenders on Crystalline Properties of Copolyamides", Journal of Beijing Institute of Clothing, Dec. 31, 2005, 7 pages.
U.S. Appl. No. 62/137,139, filed Mar. 23, 2015, Unpublished.
U.S. Appl. No. 29/643,233, filed Apr. 5, 2018 , Unpublished.
U.S. Appl. No. 29/663,029, filed Sep. 11, 2018, Unpublished.
U.S. Appl. No. 29/664,097, filed Sep. 21, 2018, Unpublished.
U.S. Appl. No. 29/679,962, filed Feb. 12, 2019, Unpublished.
U.S. Appl. No. 29/691,166, filed May 14, 2019, Unpublished.
U.S. Appl. No. 29/691,854, filed May 20, 2019, Unpublished.
U.S. Appl. No. 29/693,455, filed Jun. 3, 2019, Unpublished.
Office Action, Japanese Patent Application No. 2018-237707, Feb. 12, 2020, 14 pages.
Final Office Action, U.S. Appl. No. 15/506,951, Dec. 30, 2019, 10 pages.
Office Action, German Patent Application No. 102014216992.5, mailed Feb. 5, 2020, 10 pages.
Office Action, European Patent Application No. 15756143.2, mailed Jan. 22, 2020, 5 pages.
Joncryl ADR-4368, BASF Corporation, Jan. 25, 2018, 8 pages.
Sun et al., Novel Biodegradable Cast Film from Carbon Dioxide Based Copolymer and Poly (Lactid Acid), Journal of Polymers and the Environment, vol. 24, 2016, pp. 23-26.
U.S. Appl. No. 29/706,274, filed Sep. 19, 2019, Unpublished.
U.S. Appl. No. 29/719,889, filed Jan. 8, 2020, Unpublished.
U.S. Appl. No. 29/721,029, filed Jan. 17, 2020, Unpublished.
Office Action, European Patent Application No. 15713960.1, Jul. 7, 2020, 5 pages.
Office Action, European Patent Application No. 15756143.2, Jul. 30, 2021, 3 pages.
U.S. Appl. No. 15/506,951, Notice of Allowance, May 19, 2021, 8 pages.
Al-Itry et al., "Improvement of Thermal Stability, Rheological and Mechanical Properties of PLA, PBAT and Their Blends by Reactive Extrusion with Functionalized Epoxy", Polymer Degradation and Stability, vol. 97, 2012, pp. 1898-1947.
Office Action, Korean Patent Application No. 10-2017-7008202, Mar. 23, 2022, 20 pages.
Office Action, European Patent Application No. 15756143.2, May 17, 2022, 4 pages.
Office Action, Chinese Patent Application No. 202011292644.4, Jul. 1, 2022, 19 pages.
Office Action, Chinese Patent Application No. 202110419668.X, Jul. 20, 2022, 21 pages.
Office Action, Chinese Patent Application No. 202011296168.3, Jul. 11, 2022, 25 pages.
Office Action, Chinese Patent Application No. 202110418457.4, Jul. 27, 2022, 24 pages.
Office Action, Japanese Patent Application No. 2021-142602, Aug. 9, 2022, 4 pages.
"Pebax Product Range and Properties", Arkema, Jun. 30, 2007, 2 pages.
Chen et al., "The Effect Influence of Cross-Linking Agent and Chain Extender on the Crystalline Properties of Copolyamide", Journal of Beijing Institute of Clothing Technology, Dec. 31, 2005, 17 pages.
Extended European Search Report, European Patent Application No. 22191468.2, Sep. 13, 2022, 9 pages.
Office Action, Chinese Patent Application No. 202110418171.6, Aug. 22, 2022, 22 pages.
Office Action, Korean Patent Application No. 10-2017-7008202, Aug. 3, 2022, 6 pages.
Office Action, Japanese Patent Application No. 2021-142602, Feb. 21, 2023, 10 pages.
Office Action, Chinese Patent Application No. 202110419668.X, Feb. 17, 2023, 17 pages.
Office Action, Chinese Patent Application No. 202110418171.6, Feb. 22, 2023, 17 pages.
Office Action, Chinese Patent Application No. 202011296168.3, Jan. 31, 2023, 22 pages.
Office Action, Chinese Patent Application No. 202110418457.4, Jan. 12, 2023, 8 pages.
Non-Final Office Action, U.S. Appl. No. 17/004,430, Sep. 22, 2021, 7 pages.
Final Office Action, U.S. Appl. No. 17/004,430, Feb. 11, 2022, 11 pages.
Non-Final Office Action, U.S. Appl. No. 17/004,430, Sep. 27, 2022, 9 pages.
Final Office Action, U.S. Appl. No. 17/004,430, Apr. 13, 2023, 11 pages.
Notice of Allowance, U.S. Appl. No. 17/004,430, Mar. 6, 2024, 10 pages.
Non-Final Office Action, U.S. Appl. No. 18/644,524, Oct. 1, 2025, 7 pages.
Office Action, European Patent Application No. 23190094.5, Feb. 12, 2026, 5 pages.
Office Action, European Patent Application No. 22191468.2, Nov. 29, 2024, 6 pages.
Office Action, European Patent Application No. 22191468.2, Feb. 12, 2026, 6 pages.
Leja et al., "Polymer Biodegradation and Biodegradable Polymers—a Review", Polish Journal of Environmental Studies, vol. 19, No. 2, Mar. 2010, pp. 255-266.
Tomita et al., "Isolation of a Thermophilic Bacterium Degrading Some Nylons", Polymer Degradation and Stability, vol. 81, No. 3, Jan. 2003, pp. 511-514.

* cited by examiner 1
2
3
4
5
6
7
8
9
10
11
12

3500
3000
2500
2000
1500
1000
500
0
Storage Modulus [kPa]
EPA12
EPP
-40
-20
0
20
40
Temperature [°C]

220
210
200
201
202
205

200
220
201
202

2,3
1,5% CE +2
1,8
1,3
1% CE +1
0,8
0,3
0% CE
-0,2
Heat flow / W/g
180 190 200 210 220 230
Temperature / °C

EXPANDED POLYMER PELLETS

CROSS REFERENCE TO RELATED APPLICATIONS

This patent application is a continuation of U.S. patent application Ser. No. 17/004,430, filed on Aug. 27, 2020 ("the '430 application"), which is a divisional application of U.S. patent application Ser. No. 15/507,054, filed on Feb. 27, 2017, now U.S. Pat. No. 10,759,096 ("the '054 application"), which is a U.S. national stage application under 35 U.S.C. § 371 of PCT/EP2015/057909, filed on Apr. 10, 2015 ("the '909 application"), which application is related to and claims priority benefit from German Patent Application No. DE 10 2014 216 992.5, filed on Aug. 26, 2014 ("the '992 application"). The '430, '054, '096, '909 and '992 applications are hereby incorporated herein in their entireties by this reference.

TECHNICAL FIELD

The present invention relates to a method for producing expanded polymer pellets, the polymer pellets obtained therewith as well as their use, such as for producing cushioning elements, for example for sports apparel or sports shoes. The present invention further relates to a method for the manufacture of molded components using expanded polymer pellets, articles obtained therewith and the use of the articles, such as for sound insulation.

PRIOR ART

Expanded polymers or polymer foams are well known from the prior art. From WO 2006/077395 A1, closed-cell polyamide foams are known, which are produced in the form of sheets and can be further processed to form e.g. seals.

WO 2006/045513 A1 and EP 1650 255 A1 describe the production of a cross-linked foam of a copolymer having polyamide blocks and polyether blocks and the use of the foam. WO 2007/082838 A1 relates to expandable, blowing agent-containing thermoplastic polyurethane having a specific hardness. In a similar manner, WO 2010/010010 A1 relates to an expandable, blowing agent-containing thermoplastic polymer blend comprising thermoplastic polyurethane and styrene polymer. DE 10 2011 108 744 A1 is directed towards a method for the production of shoe soles, wherein plastic bodies made from foamed thermoplastic elastomer on the basis of urethane (TPU) or on the basis of polyetherblockamide (PEBA) are used.

Compared to this, the objective of the present invention is to provide expanded polymer pellets that can be produced in as wide a processing window as possible and that can be further processed to form stable parts which can be used in a broad area of application, e.g. for the production of parts having damping properties and a low weight. A further objective is to provide an improved method for the manufacture of molded components or articles from expanded polymer pellets.

SUMMARY OF THE INVENTION

According to a first aspect, this objective is solved by a method for producing expanded polymer pellets, which comprises the following steps:

a. melting a polymer comprising a polyamide;
b. adding at least one blowing agent;

c. expanding the melt through at least one die for producing an expanded polymer; and
d. pelletizing the expanded polymer.

The invention further concerns polymer pellets produced with the method as well as their use, e.g. for the production of cushioning elements for sports apparel, in particular for producing soles or parts of soles of sports shoes. In addition, the invention concerns a shoe, in particular a sports shoe, with such a sole.

The polyamide may, for example, comprise as a basis a polyamide, a copolyamide and/or a polyetherblockamide. Furthermore, the polyetherblockamide may comprise at least one of the following features:

- a Shore D hardness in the range from 20 to 70 Shore D;
- a tensile modulus in the range from 10 to 1100 MPa;
- a content of polyether blocks from 1 to 90% by weight, preferably from 1 to 75% by weight, more preferably from 1 to 50% by weight, and a content of polyamide blocks from 10 to 99% by weight, preferably from 25 to 99% by weight, more preferably from 50 to 99% by weight, in each case based on 100% by weight of the polyetherblockamide;
- a density in the range from 1000 to 1030 $g/m^3$; and
- a melting point/melting range from 110 to 200° C.

The blowing agent may be selected from nitrogen, carbon dioxide, ethanol, isopropanol, or mixtures thereof. Furthermore, a nucleating agent, a chain extender, or both may be added in step b.

It is possible that the die is a round die. The pressure at the die may lie in the range of 70 to 250 bar. The mass temperature at the die may lie in the range from 150° C. to 170° C.

It is possible that the expanded polymer is pelletized in an underwater pelletizing device.

A further aspect of the invention concerns expanded polymer pellets, which are obtainable by a method described above. The pellets may comprise a size in the range from 2 to 10 mm when measured according to ISO 9276. Moreover, the pellets may comprise a particle density in the range from 20 to 400 $kg/m^3$. Furthermore, the pellets may comprise a mean cell diameter in the range from 10 to 350 μm.

A further aspect of the invention concerns the use of the expanded polymer pellets for producing cushioning elements for sports apparel, in particular for producing soles for shoes.

A further aspect of the invention concerns a cushioning element for sports apparel, in particular a sole for a shoe or a part thereof, produced using the expanded polymer pellets described above.

A further aspect of the invention concerns a shoe, in particular a sports shoe, with a sole as described above.

A further aspect of the invention concerns expanded polymer pellets which are based on polyamide, and exhibit a variation of less than 50% in their storage modulus in the temperature range of −40° C. to +40° C.

A second aspect of the invention relates to a method for the manufacture of molded components, comprising a. loading pellets of an expanded polymer material into a mold; and
b. connecting the pellets by providing heat energy, wherein
c. the expanded polymer material of the pellets comprises a chain extender.

In an exemplary embodiment the chain extender has been provided after a polymerization of the polymer material.

In another exemplary embodiment, the expanded polymer material comprises a semi-crystalline polymer.

In step b, the heat energy can be provided by means of at least one of the following: pressurized steam, electromagnetic radiation, radio frequency radiation, microwave radiation, infrared radiation, ultraviolet radiation, electromagnetic induction.

In one embodiment, during step b. the pellets are heated to a temperature between a glass transition temperature and below the onset of melting of the expanded polymer material. In exemplary embodiments, the pellets are heated up to a range of from 100° C. to 5° C. below the melting point of the expanded polymer material. They may be heated up to a range of from 60° C. to 5° C. below the melting point of the expanded polymer material, such as 40° C. to 5° C. below the melting point of the expanded polymer material.

The chain extender can comprise at least one selected from a polymeric material containing epoxy groups, pyromellitic dianhydride, and styrene maleic anhydride, or combinations of one or more thereof. In one embodiment, the chain extender is a styrene-acrylate copolymer containing reactive epoxy groups, such as a compound of the following formula:

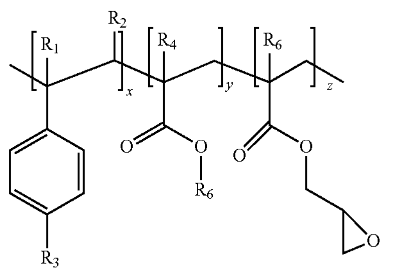

wherein $R_1$ to $R_5$ are H, $CH_3$, a higher alkyl group, or combinations of them; $R_6$ is an alkyl group, and x, y, and z are each between 1 and 20.

In another embodiment, the chain extender is selected from one or more of a tri-epoxide or tetra-epoxide. The chain extender may be, for example, triglycidyl isocyanurate and/or tetraglycidyl diamino diphenyl methane. In another embodiment, the chain extender is selected from one or more of styrene maleic anhydride. In a further embodiment, the chain extender is pyromellitic dianhydride.

In one embodiment, the polymer is selected from at least one of polyamides, polyester, polyetherketones, and polyolefins. The polyamide can be at least one of homopolyamide, copolyamide, polyetherblockamide, and polyphthalamide. The polyester can be at least one of polybutylene terephthalate (PBT), thermoplastic polyester ether elastomer (TPEE), and polyethylene terephthalate (PET). The polyetherketone can be at least one of polyether ketone (PEK), polyether ether ketone (PEEK), and polyetherketoneketone (PEKK). The polyolefin can be at least one of polypropylene (PP), polyethylene (PE), olefin co-block polymer (OBC), polyolefine elastomer (POE), polyethylene co-vinyl acetate (EVA), polybutene (PB), and polyisobutylene (PIB).

In another embodiment, the polymer is selected from at least one of polyoxymethylene (POM), polyvinylidene chloride (PVCD), polyvinylalcohol (PVAL), polylactide (PLA), polytetrafluoroethylene (PTFE), polyvinylidene fluoride (PVDF), tetrafluoroethylene (FEP), ethylene-tetrafluoroethylene (ETFE), polyvinylfluoride (PVF), perfluoroalkoxy (PFA), and thermoplastic polyurethanes (TPU).

In an exemplary embodiment, the polymer comprises polybutylene terephthalate (PBT) and the chain extender comprises at least one selected from a polymeric material containing epoxy groups, pyromellitic dianhydride, styrene maleic anhydride, or combinations of one or more thereof, in particular a styrene-acrylate copolymer containing reactive epoxy groups. In another exemplary embodiment, the polymer comprises polyamide (PA) or polyetherblockamide (PEBA) and the chain extender comprises at least one selected from a polymeric material containing epoxy groups, pyromellitic dianhydride, styrene maleic anhydride, or combinations of one or more thereof, in particular a styrene-acrylate copolymer containing reactive epoxy groups. In a further exemplary embodiment, the polymer comprises thermoplastic polyester ether elastomer (TPEE) and the chain extender comprises at least one selected from a polymeric material containing epoxy groups, pyromellitic dianhydride, styrene maleic anhydride, or combinations of one or more thereof, in particular a styrene-acrylate copolymer containing reactive epoxy groups.

A further aspect of the invention relates to a method for the manufacture of molded components, comprising a. loading pellets of an expanded polymer material into a mold, wherein the expanded polymer material of the pellets comprises an additive increasing the amorphous content of the polymer material; and
b. connecting the pellets by heating the pellets to a temperature between a glass transition temperature and below the onset of melting of the expanded polymer material.

In one embodiment of the manufacture method of the second or further aspect, the pellets are produced by a method comprising the steps of:

a. melting a polymer material wherein the melt comprises at least one polymer, at least one blowing agent and at least one selected from a chain extender or an additive increasing the amorphous content of the polymer material;
b. expanding the melt through at least one die for producing an expanded polymer material; and
c. pelletizing the expanded polymer material, in particular in an underwater pelletizer.

In some embodiments, the pellets are produced by the method according to the first aspect of the invention.

The chain extender may be added in an amount to provide amorphous regions in the expanded polymer material allowing interdiffusion of polymer chains across the interfaces of the pellet boundaries, in particular in an amount of 0.1 to 20% by weight, more particular 1% to 10% by weight, such as 1% to 5% by weight, based on 100% by weight of the base polymer material.

The base polymer material may be a polyamide, for instance at least one of homopolyamide, copolyamide, polyetherblockamide, and polyphthalamide, as an example, polyamide 12.

The chain extender may be a polymeric material containing epoxy groups, such as a styrene-acrylate copolymer containing reactive epoxy groups.

It is possible that the pellets of the expanded material have internally an at least partially ruptured foam structure.

A further aspect of the invention concerns an article, which is obtainable by the method described above with respect to the second or further aspect of the invention.

In an exemplary embodiment, the article is produced using pellets of the expanded material that may have internally an at least partially ruptured foam structure. Such an article may be used for e.g. sound insulation.

Another aspect concerns an article as described above, wherein the article is provided as at least one of the following: a packaging material, a reusable packaging material, a pallet, an article for medical transportation, an article for chemical transportation, an article for breakable goods transportation, an article for interior insulation, an article for exterior insulation, an article for pipe insulation, a geofoam, a temporary housing, a road crash protection, an article for appliance insulation, an article for industrial appliance insulation, a sun visor, a dash board, a car seat, a center console, a car door, a child/baby seat, an article for battery cover/insulation, an article for engine insulation, a bumper, a crash structure, a protective helmet, an article of protective clothing, a boat fender, a medical stretcher, a surf/rescue board, a buoy, a boat hull, a snowmobile seat, a core for skis/snowboards/water skis/wakeboards, a jet ski seat, an artificial turf, a venue or playground flooring, a sports hall protective flooring/wall, a conditioning roller, a resistance weight for aerobics, a swimming aid, an article of furniture, a bean bag, a cow mat, a drone, an article of luggage, a plane seat, a plane/glider wing, an article for aeroplane cabin insulation, a plane food tray, an article for airline food trolley insulation, an under floor, an article for heating protection, an article of advanced protective equipment, a medical cast, a turbine/rotor blade core, a run-flat tyre, hand grips, beverage insulation, lamp covers, mattresses.

Another aspect concerns the use of an article produced with the method according to the second or further aspect of the invention, in the production of cushioning elements for sports apparel, in particular for the production of soles for shoes, preferably midsoles.

Another aspect concerns the use of an article produced with the method according to the second or further aspect of the invention, for packaging applications, reusable packaging, pallets, medical transportation, chemical transportation, breakable goods transportation, interior insulation, exterior insulation, pipe insulation, geofoam, temporary housing, road crash protection, appliance insulation, industrial appliance insulation, sun visor, dash board, car seat, center console, car door, child/baby seat, battery cover/insulation, engine insulation, bumper, crash structures, protective helmet, protective clothing, boat fenders, medical stretchers, surf/rescue boards, buoys, boat hulls, snowmobile seats, core for skis/snowboards/water skis/wakeboards, jet ski seat, artificial turf, venue or playground flooring, sports hall protective flooring/walls, conditioning roller, resistance weights for aerobics, swimming aids, furniture, bean bags, cow mats, drones, luggage, plane seats, plane/glider wings, aeroplane cabin insulation, plane food tray, airline food trolley insulations, under floor, heating protection, advanced protective equipment, medical cast, turbine/rotor blade core, a run-flat tyre, hand grips, beverage insulation, lamp covers, mattresses.

A further aspect of the invention concerns a shoe, comprising an element, in particular a sole, obtainable by a method described above with respect to the second or further aspect of the invention. Another aspect of the invention concerns a shoe comprising a foam element molded by using a method described above with respect to the second or further aspect of the invention.

Preferred embodiments of the invention are described in the following description, the figures and the claims.

DETAILED DESCRIPTION OF PREFERRED EMBODIMENTS

Figure 1:
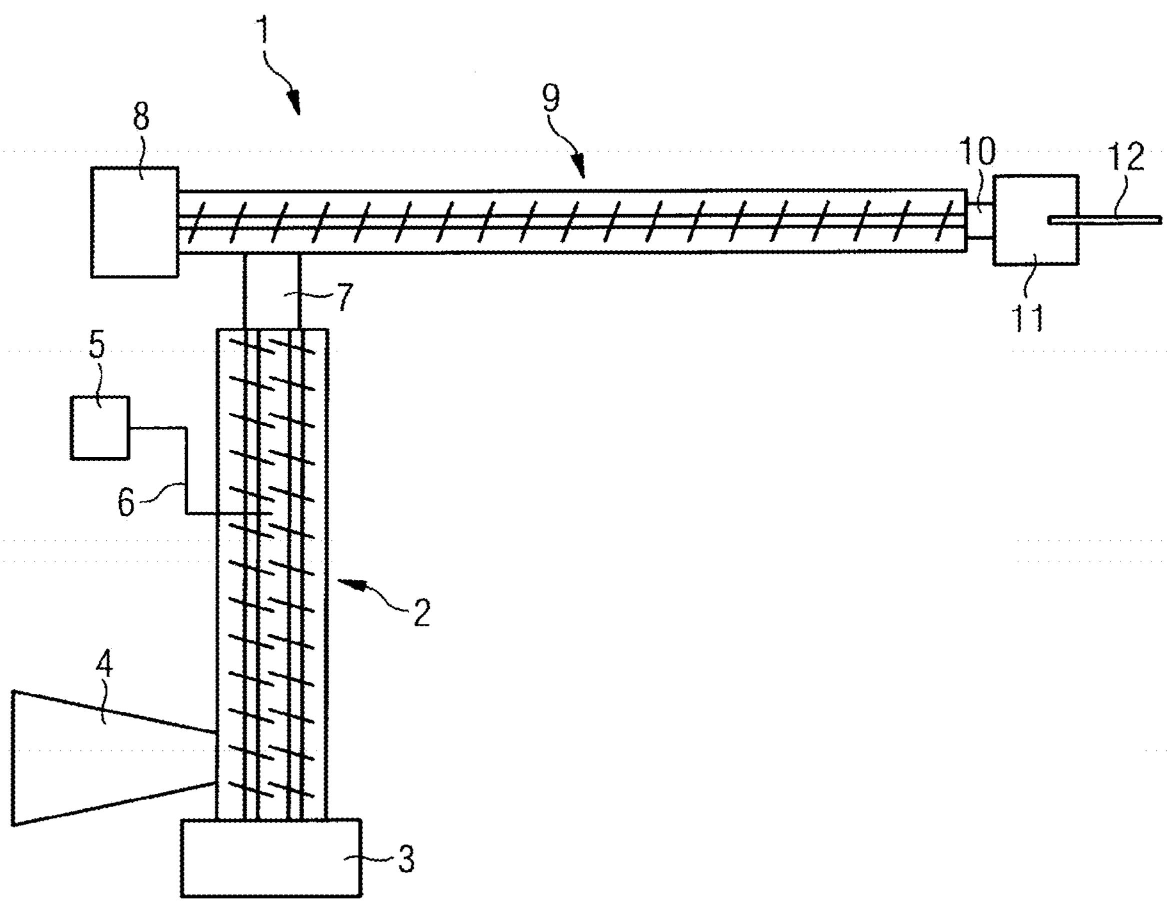
FIG. 1: an experimental setup for performing steps a. to c. of the method according to the invention.

In the following detailed description, preferred examples and embodiments of the invention are described.

First Aspect of the Invention

The polymer used for the production of the expanded polymer pellets comprises at least one polyamide. The polymer can be on the basis of a polyamide. In particular, the polymer can comprise at least 10% by weight, in particular at least 30% by weight, preferably at least 50% by weight, of a polyamide, in each case based on 100% by weight of the polymer. Preferred ranges are 10 to 99% by weight, preferably 25 to 99% by weight, more preferably 50 to 99% by weight, of polyamide, in each case based on 100% by weight of the polymer. It is also possible that the polymer comprises or consists of 100% by weight of polyamide.

The polymer can be on the basis of a polyamide. In particular, the polymer can comprise at least 10% by weight, in particular at least 30% by weight, preferably at least 50% by weight, of a polyamide, in each case based on 100% by weight of the polymer. Preferred ranges are 10 to 99% by weight, preferably 25 to 99% by weight, more preferably 50 to 99% by weight, of polyamide, in each case based on 100% by weight of the polymer. It is also possible that the polymer comprises or consists of 100% by weight of polyamide.

Suitable polymers are polyamides or polyamide-containing polymers that are expandable. Particularly suitable are those having a tensile modulus above 10 MPa and/or having a low temperature dependency. Suitable are, for example, polyamide-6 (PA 6), polyamide-6.6 (PA 6.6), polyamide-6.10 (PA 6.10), polyamide-11 (PA 11), polyamide-12 (PA 12), polyamide-10.12, or polyamide-10.10. Also combinations thereof can be used. Particularly well suited is PA 11 or PA 12, or a mixture thereof. Preferably, PA 12 is used. Suitable polyamides or polyamide-containing polymers are commercially available.

Particularly well suited is polyetherblockamide (PEBA). Polyetherblockamide is a blockcopolymer with polyamide-segments and polyether-segments. For example, suitable polyetherblockamides comprise a content of polyether-blocks from 1 to 90% by weight, in particular from 1 to 50% by weight, and a content of polyamide-blocks from 10 to 99% by weight, in particular from 50 to 99% by weight, in each case based on 100% by weight of the polyetherblockamide. It is also possible to use blends or mixtures of two or more, in particular two, different polyetherblockamides. It is further possible that the polymer comprises or consists of 100% by weight of polyetherblockamides. It is further possible that the polymer comprises or consists of 100% by weight of polyamide and polyetherblockamides.

Particularly well suited are furthermore polyetherblockamides which comprise at least one of the following properties:

- a Shore D hardness in the range from 20 to 70 Shore D, in particular from 35 to 70 Shore D;
- a tensile modulus in the range from 10 to 1100 MPa, in particular from 80 to 1000 MPa;
- a density in the range from 1000 to 1030 $g/m^3$;
- a melting point/melting range in the range from 110 to 200° C., in particular from 130 to 175° C.

Herein, the Shore D hardness is measured according to ISO 868. The tensile modulus is measured according to ISO 527-1. The density is measured according to ISO 1183. In the present invention, the melting point or melting range, respectively, relates to a measurement according to ISO 11357. Herein, the melting point or melting range, respectively, of the polymer designates the point or range at or within which the crystalline regions of a semi crystalline polymer melt.

Suitable polyetherblockamides are commercially available. They may be produced by known methods, e.g. by means of copolycondensation of polyamide-blocks containing reactive ends with polyether-blocks containing reactive ends such as described in WO 2006/045513 A1.

From among the mentioned polyamides and polyetherblockamides, mixtures or blends thereof might be used as well. The polymer for producing the expanded polymer pellets may contain or be blended with another polymer in addition to the polyamide, for example, thermoplastic polyurethane (TPU), polyphenylene ether (PPE), styrene-acrylonitrile (SAN), and/or rubber, in particular TPU. The content of the other polymer may be below 50% by weight, in particular below 10% by weight, preferably below 5% by weight, based on 100% by weight of the polymer. In one embodiment, the polymer used for producing the expanded pellets comprises no (i.e. 0%) thermoplastic polyurethane. In one embodiment the polymer used for producing the expanded pellets comprises no (i.e. 0%) other polymer than the polyamide.

The polymer used for producing the expanded pellets may be used in any form, for example as granulate or powder, in particular as granulate. Suitable forms of the polymers are commercially available. In case that the base or starting polymer contains adherent humidity or water, the polymer is preferably dried before melting and drying is completed prior to foaming, in accordance with procedures known to the skilled person.

In the first step of the method according to the invention, the polymer is melted. Suitable methods for melting or fusing are known to the person skilled in the art. The melting may, for example, be done in an extruder. Suitable extrusion devices or extruders are not subject to any restrictions. Common extruders or commercially available extruders can be used, for example single screw or twin screw extruders. The extruder also serves to homogeneously disperse the polymer.

The dimensioning of the extruders (e.g. design, length and number of revolutions of the extruder screws, temperature profile, pressure) may be chosen by the skilled person, such that added materials are homogeneously dispersed and intermixed into the melted polymer. The extruder is usually operated at a temperature at which the polymer material is completely melted. Suitable temperatures depend on the polymer used and can be routinely determined by the skilled person, for example, for polyamide 12 suitable temperatures are in the range from 180 to 320° C., in particular from 220 to 290° C.

It is also possible to use two extruders arranged in series. Good results are, for example, obtained, if the first extruder is a twin screw extruder and the second extruder is a single screw extruder. The first extruder is used to plasticize the material and homogeneously disperse additional materials, e.g. a blowing agent. Due to the inclusion of the blowing agent, the viscosity of the material is significantly reduced, and the second extruder could be used to cool down the material in order to improve the melt properties and increase the pressure needed for foaming expansion. This can also be achieved by employing a single extruder being sufficiently long to allow the material to be heated and then cooled in a controlled way. Additionally, it is possible to insert a static mixer between the first and second extruder. Suitable temperatures for the first extruder lie in the range from 170 to 320° C., in particular in the range from 170 to 220° C. or from 220 to 290° C. Suitable temperatures for the second extruder depend stronger on the used polymer, e.g. for polyamide 12 a mass temperature in the range from 150 to 190° C., in particular from 165 to 180° C., is suitable, and for polyetherblockamide a mass temperature in the range from 130 to 180° C., in particular from 155 to 165° C., is suitable.

An exemplary arrangement 1 is shown in FIG. 1, with a twin screw extruder 2 and a single screw extruder 9. According to FIG. 1, polymer is introduced at hopper 4 and blowing agent 5 is fed by means of an injection device 6. It is possible to introduce additional materials, e.g. a chain extender, at hopper 4 together with the polymer and/or at the point of injection device 6 or in the vicinity thereof. The extruder 2 is moved via a gear 3. In the extruder 2, the polymer is melted and mixed with the injected blowing agent 5 and optionally additional material added. According to FIG. 1, an adapter 7 is provided between the extruder 2 and the extruder 9, and the extruder 9 is moved via a gear 8. The extruder 9 may, for example, be a cooling extruder. In the extruder 9, the polymer melt is further mixed with the blowing agent and cooled and subsequently extruded through a die 11, preferably a round die, such that a foamed or expanded extrudate 12 is obtained. The die 11 is connected to the extruder 9 via an adapter 10.

In one embodiment, at least one blowing agent is added to the melted polymer. In general, volatile liquids, gases, and decomposable compounds that are inert with respect to the polymer melt under the conditions present in the extruder and which form a gas, are suitable as a blowing agent. Suitable blowing agents are nitrogen, carbon dioxide, ethanol, isopropanol, or mixtures thereof. Particularly well suited is supercritical carbon dioxide, or a mixture of supercritical carbon dioxide with ethanol. The blowing agent may be fed to the extruder with the base polymer with or without being previously mixed. Alternatively, the blowing agent may be added to the polymer melt at a suitable location of the extruder and be intermixed within the extruder. Suitably, the blowing agent is homogeneously dispersed in the polymer or melted polymer. The amount of added blowing agent lies in the range from 1 to 20% by weight, in particular from 1 to 10% by weight, in each case based on 100% by weight of the polymer melt. Particular amounts of blowing agent are 1, 2, 3, 4, 5, 7.5, 10 or 15% by weight, based on 100% by weight of the polymer melt. Particularly suitable is e.g. a carbon dioxide-ethanol mixture with 2 to 6% by weight of carbon dioxide and 2 to 4% by weight of ethanol, based on 100% by weight of the polymer melt.

In addition to the blowing agent, further conventional additives or materials that facilitate the processing may be added to the polymer melt in the extruder, for example, a nucleating agent, a chain extender, flame inhibitors, plasticizers, reinforcing agents, pigments, dyes, heat- or light-stabilizers, antistatic agents, fillers, or mixtures thereof. Suitable nucleating agents are additives which can be both soluble and not soluble in the polymer melt to promote foam cell nucleation. Examples of non-soluble nucleating agents include talc, or silica. It is also possible to add a crosslinking agent to the polymer melt. Crosslinking agents are described e.g. in WO 2006/045513 A1 and EP 1 650 255 A1. In one embodiment, no crosslinking agent is used, or the polymer pellets are not crosslinked.

In one embodiment, at least one chain extender is added to the polymer melt. It is also possible to feed at least one chain extender together with the polymer to the extrusion device. Suitable chain extenders are compounds which increase the melt strength of the polymer melt. Particularly suitable chain extenders are oligomeric or polymeric compounds with reactive groups, e.g. epoxy groups, which react with the melted polymer to increase the molecular weight and degree of branching, thus improving the rheological properties, such as the melt viscosity and the melt strength of the polymer used. Suitable chain extenders can be based on styrene-acrylate copolymers and are commercially available, e.g. Joncryl® ADR-4368C of BASF. Suitable amounts of chain extender are 0.05 to 10% by weight, in particular 0.1 to 5% by weight or 0.1 to 3% by weight, based on 100% by weight of the polymer. The use of chain extenders is particularly beneficial when using polyetherblockamides as polymers for the production of the expanded pellets.

In one embodiment, the polymer for producing the expanded pellets comprises polyetherblockamide or consists of polyetherblockamide, and a chain extender is added as additional material to the polymer melt.

In addition, it is also possible to melt the polymer together with granulate made of used tires (rubber) and caoutchouc powder. The thermal decomposition of the compounds in the extruder leads to the formation of cracked gas (nitrogen and carbon monoxide), which can act as blowing agent, and carbon, which can act as reinforcing and nucleating agent.

After extrusion the melt is expanded through a die. The die may, for example, be a round die or a slit die, in particular a round die. The diameter of the die depends on the size of the extruder, the desired particle size and density, and may be e.g. in the range from 1 to 5 mm. Expediently, the die is attached to the extruder. The pressure at the die depends on the polymer material used and density specification, and may lie in the range from 40 to 400 bar, in particular in the range from 60 to 250 bar. Preferably, for polyamide the pressure may lie in the range from 80 bar to 220 bar, and for polyetherblockamide the pressure may lie in the range from 45 bar to 200 bar. The mass temperature at the die depends on the polymer melt and may lie in the range from 140 to 180° C., in particular from 150 to 170° C.

Inside the die and particularly after leaving the die, the melt is subjected to a sudden pressure drop and the polymer expands or foams. Depending on the shape of the die, the expanded or foamed polymer is obtained as a strand or a foil. Preferably, a round die is used to obtain a strand. The expanded polymer or foam is stabilized by cooling. Cooling can be done in an under-water pelletizing device, a water bath, a conveyor belt, or a calibration unit where the geometry of the foam strand also can be adjusted.

Subsequently, the expanded polymer is pelletized. Suitable pelletizing devices are known to the skilled person, e.g. an under-water pelletizing device or an under-water granulator. The pelletizing may, for example, be performed in an under-water pelletizing device which enables both controlled cooling of the expanded polymer and pelletizing. Such devices are commercially available. Their operation is based on the principle that the polymer strand leaving the die is cut into discrete particles in a cutting chamber that is completely filled with water. The dimensions of the cut particles depend upon the cutting speed and throughput of the extruder/die and also the dimensions of the die. Suitable temperatures for the water in the cutting chamber are in the range of from 20 to 100° C., in particular from 50 to 100° C., preferably from 70 to 90° C. Due to the temperature difference between the extrudate having been expanded through the die and the water in the cutting chamber, the polymer immediately solidifies in form of particles, preferably sphere-like particles. The pelletizing device is expediently positioned directly after the die. A suitable under-water pelletizing device is for example shown in FIG. 2. Another suitable underwater pelletizer is described in U.S. Pat. No. 5,629,028.

Figure 2:
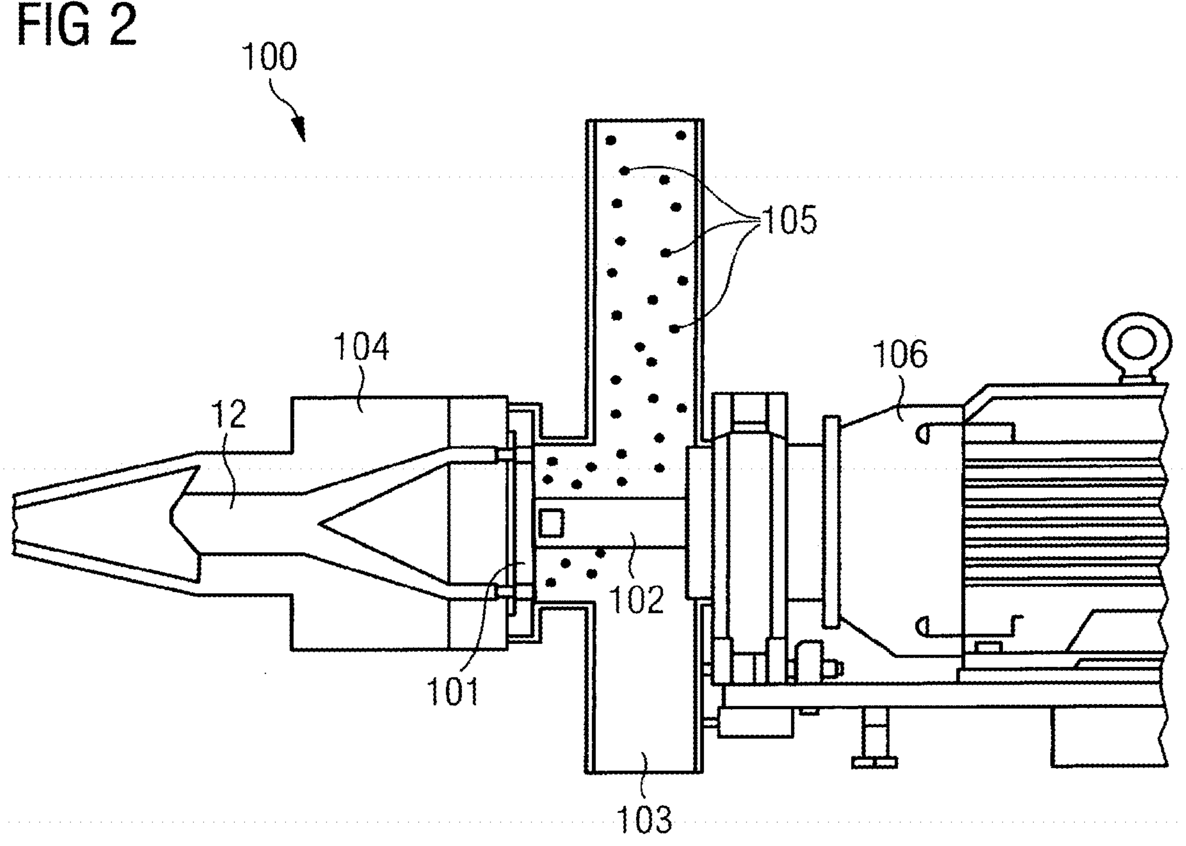
FIG. 2: schematic diagram of an underwater pelletizing device for performing step d. of the method according to the invention.

FIG. 2 shows an exemplary arrangement for a device 100 for under-water pelletizing with die face plate 101, cutting blade assembly 102 and water circulation housing 103. As shown, the expanded polymer 12 (see FIG. 1) passes, via an extruder die 104, the die face plate 101 and is subsequently cut into particles 105 by the cutter blade assembly 102 which is surrounded by water circulating in the housing 103. The extruder die 104 is arranged between the extruder and the under-water pelletizing device 100, and conveys the expanded polymer 12 from the extruder to the under-water pelletizing device 100. The particles 105 are leaving the water circulation housing 103 and are subsequently dried (not shown). The under-water pelletizing device 100 is driven by gear 106.

Figure 3:
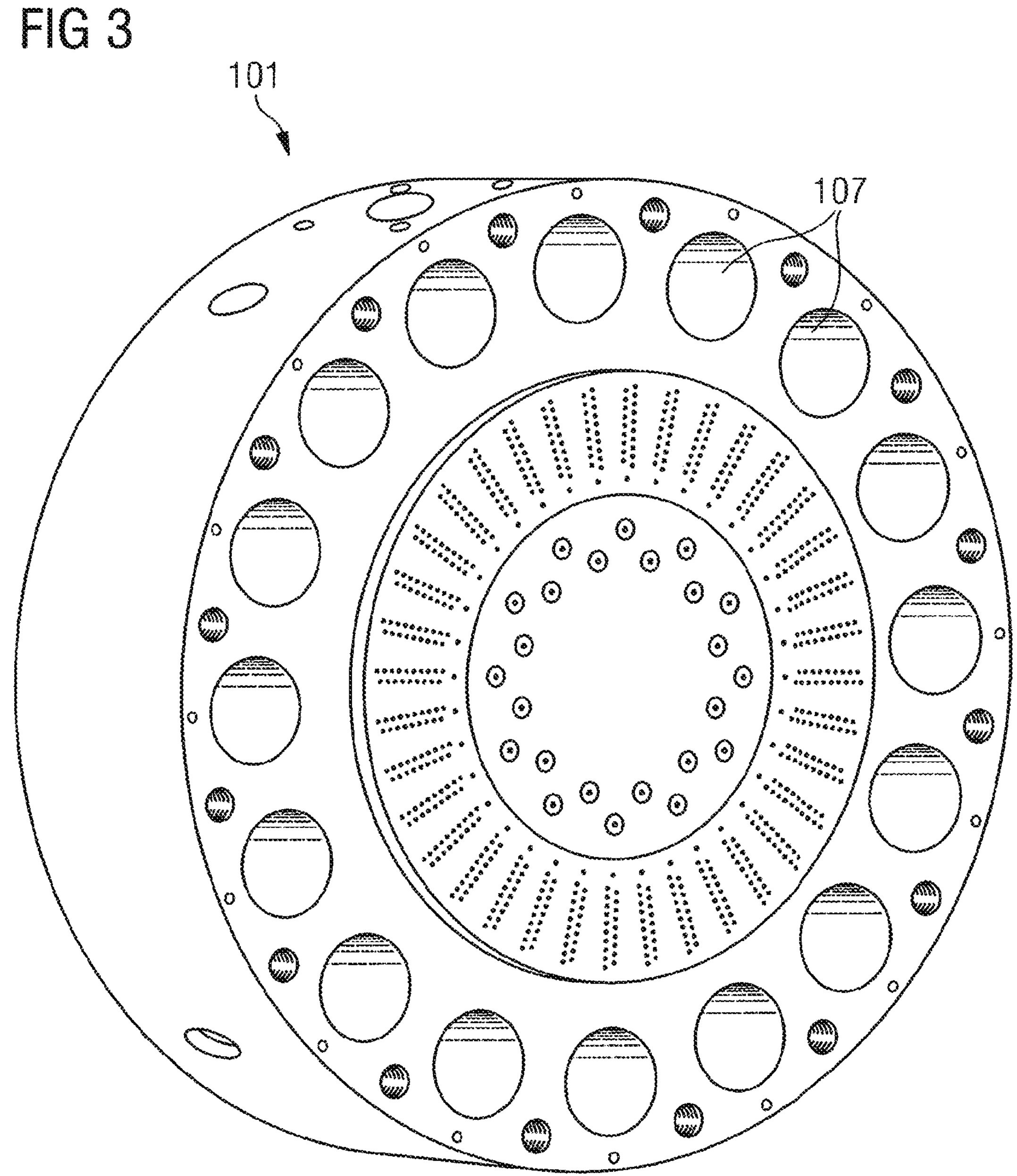
FIG. 3: schematic diagram of a die face plate of an underwater pelletizing device.

FIG. 3 shows a schematic diagram of a die face plate 101 of an underwater pelletizing device. The die face plate 101 contains holes 107. The number of holes depends on the dimensions or size of the extrusion device. In exemplary embodiments, the diameter of the holes is between 2.3 mm and 2.6 mm and the number of holes between 1 and 4, e.g. there may be 2 holes when using a diameter of 2.3 mm.

The shape and size of the expanded polymer pellets can be adjusted by e.g. the throughput in the extruder, the shape of the die, the temperature and pressure at the die, the water temperature and water pressure in an under-water pelletizer, the cutting speed of the blades of the pelletizer. The selection of suitable conditions lies within the routine skill and knowledge of the skilled person.

The expanded polymer pellets may have a spherical shape, an ellipsoid shape, or triangular shape. Preferably, the pellets have substantially spherical shape. If the pellets are essentially spherical in shape, they may, for example, comprise a size from 2 to 10 mm when measured according to ISO 9276, and a particle density in the range from 20 to 400 $kg/m^3$, e.g. from 50 to 300 $kg/m^3$. Suitable mean cell diameters are within the range from 10 to 350 μm.

The invention also concerns expanded polymer pellets which are based on polyamide, and exhibit a variation of less than 40%, preferably a variation in the range of 30 to 40%, in their storage modulus in the temperature range of −40° C. to +40° C. Preferably, they have a density in the range of from 70 to 100 $kg/m^3$.

The invention further concerns expanded polymer pellets which are based on polyetherblockamide, and when formed into a test plate exhibit a relative energy loss during a full hysteresis cycle (after 10 or more cycles) in the range from 10 to 90%, preferably from 10 to 35%. Preferably, they have a density in the range of from 50 to 90 $kg/m^3$. Herein, the relative energy loss during a full hysteresis cycle designates the quotient of the area (integral) within the hysteresis loop divided by the total energy exerted during compression, i.e. the area (integral) under the compression branch of the hysteresis loop in a force versus compressive strain (displacement) diagram. This is illustrated in FIGS. **5*b* and 5*a***, respectively, and further described in Example 2 below.

The expanded polymer pellets can be used in a wide range of applications. The expanded polymer pellets may be processed to form components that are very light-weight and show good temperature performance and temperature independence. They can be processed to produce components exhibiting light-weight, good elasticity and good energy resilience in a wide temperature range.

The expanded polymer pellets are therefore very well suited for producing cushioning elements or components with cushioning properties, such as for sport apparel, for example for producing soles for shoes, in particular sports shoes. To this end, the expanded polymer pellets are expediently loaded into a mold comprising a cavity having a shape that corresponds to the component being produced. Therein, the expanded polymer pellets are connected to each other, in particular by letting heat act on them, for example by feeding pressurized steam to the mold.

The invention also concerns sports apparel and shoes, in particular sports shoes, produced using of the expanded polymer pellets.

Other applications of use for the expanded polymer pellets are areas where cushioning or damping properties and high stability within a large temperature range are desirable, e.g. in the automotive sector or aviation industry. They also can be used to form components having good energy absorbing properties. They are, for example, suitable in components for automotive crash protection.

Second Aspect of the Invention

In a second aspect, the invention concerns a method for the manufacture of molded components, comprising loading pellets or beads of an expanded polymer material into a mold, and connecting the pellets or beads by providing heat energy, wherein the expanded polymer material of the pellets or beads comprise a chain extender. The terms "pellets" and "beads" are used interchangeably herein.

As an example, the chain extender can be provided after a polymerization of the polymer material. For example, the chain extender can be added in a separate compounding step and/or immediately before expanding the polymer material. The chain extender may be incorporated into the base polymer material that is used for the production of the pellets of the expanded polymer material. The chain extender may be added to the base polymer in a compounding stage. Alternatively, the base polymer may be first supplied to the polymer processing apparatus, e.g. an extruder, via a supply, e.g. a hopper, and then the chain extender may be added.

For connecting the pellets, heat energy may be provided in a variety of different ways. The heat energy may for example be provided in the form of pressurized steam that is supplied to the molding tool. Alternatively or in addition, the heat energy may also be provided by means of an electromagnetic field. The heat energy may for example be provided by irradiating the molding tool and/or the pellets with electromagnetic radiation. The electromagnetic radiation may for example be selected from one or more of the following frequency ranges: radio frequency radiation (30 kHz-300 MHz), microwave radiation (300 MHz-300 GHz), infrared radiation (300 GHz-400 THz), ultraviolet radiation (789 THz-3 PHz), or from another frequency range. The heat energy may also be provided by means of electromagnetic induction. An energy absorbing material may be added to the pellets, to increase the amount of heat energy absorbed by the pellets, for example when irradiated with electromagnetic radiation or being heated by electromagnetic induction. All of the above mentioned possibilities may be combined with one another.

During step b. the pellets can be heated to a temperature between a glass transition temperature and below the onset of melting of the expanded polymer material. This heating leads to an increase of the amorphous chain mobility and to bead to bead fusion of the expanded polymer pellets. As an example, the heating is preferably conducted above a glass transition temperature of the expanded polymer material. In exemplary embodiments, the pellets are heated up to a range of from 100° C. to 5° C. below the melting point of the expanded polymer material. They may be heated up to a range of from 60° C. to 5° C. below the melting point of the expanded polymer material, such as 50° C. to 5° C. below or 40° C. to 5° C. below the melting point of the expanded polymer material.

The term "onset of melting" as used herein means the temperature at which the polymer material starts to melt. This may be determined e.g. according to DSC (differential scanning calorimetry), such that, in a diagram of heat flow versus temperature, the temperature at which the heat flow increases indicates the onset of melting. The term "melting point" as used herein, means e.g. the melting peak obtained by DSC. Suitable conditions for DSC are e.g. a heating rate of 10K/min for a temperature range of 25° C. to 250° C. The glass transition temperature of the expanded polymer material also can be determined by, for example, DSC.

The chain extender can comprise at least one compound selected from a polymeric material containing epoxy groups, pyromellitic dianhydride, and styrene maleic anhydride, or combinations of two or more thereof. Suitable chain extenders are styrene-acrylate copolymers containing reactive epoxy groups, for example, a compound of the following formula:

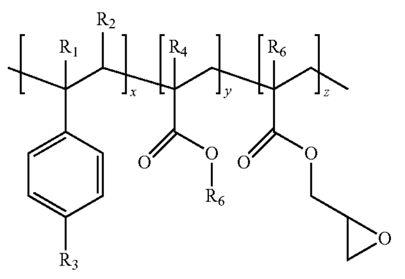

wherein $R_1$ to $R_5$ are H, $CH_3$, a higher alkyl group, or combinations of them; $R_6$ is an alkyl group, and x, y, and z are each between 1 and 20. Such a chain extender is commercially available as Joncryl® ADR-4368C (of BASF)

The chain extender also may be a tri-epoxide, tetra-epoxide, or a combination thereof. Suitable chain extenders are, for example, triglycidyl isocyanurate and/or tetraglycidyl diamino diphenyl methane. Another suitable chain extender is a styrene maleic anhydride. A further suitable chain extender is pyromellitic dianhydride.

The expanded polymer material may comprise a semi-crystalline polymer, or a polymer blend containing at least one semi-crystalline polymer.

The polymer of the expanded polymer material may be polyamide, polyester, polyetherketone, polyolefin, or a combination thereof. The polyamide can be homopolyamide, copolyamide, polyetherblockamide, polyphthalamide, or a combination thereof. A very suitable material is polyetherblockamide (PEBA). Generally the polyamides can be the same polyamides as defined above in the context of the first aspect of the invention. The polyester can be polybutylene terephthalate (PBT), thermoplastic polyester ether elastomer, (TPEE), polyethylene terephthalate (PET), or a combination thereof. The polyetherketone can be polyether ketone (PEK), polyether ether ketone (PEEK), polyetherketoneketone (PEKK), or a combination thereof. The polyolefin can be polypropylene (PP), polyethylene (PE), olefin co-block polymer (OBC), polyolefine elastomer (POE), polyethylene co-vinyl acetate (EVA), polybutene (PB), polyisobutylene (PIB), or a combination thereof.

Other suitable polymers are polyoxymethylene (POM), polyvinylidene chloride (PVCD), polyvinylalcohol (PVAL), polylactide (PLA), polytetrafluoroethylene (PTFE), polyvinylidene fluoride (PVDF), tetrafluoroethylene (FEP), ethylene-tetrafluoroethylene (ETFE), polyvinylfluoride (PVF), perfluoroalkoxy (PFA), thermoplastic polyurethane (TPU), or a combination thereof.

As an example, the polymer comprises polybutylene terephthalate (PBT) and the chain extender comprises a polymeric material containing epoxy groups. As a further example, the polymer comprises PBT and the chain extender comprises pyromellitic dianhydride. As a further example, the polymer comprises PBT and the chain extender comprises styrene maleic anhydride. As a further example, the polymer comprises PBT and the chain extender comprises a styrene-acrylate copolymer containing reactive epoxy groups, or e.g. Joncryl® ADR-4368C.

As another example, the polymer comprises polyamide, such as polyamide 12, or polyetherblockamide (PEBA), and the chain extender comprises a polymeric material containing epoxy groups. As a further example, the polymer comprises polyamide, such as polyamide 12, or polyetherblockamide (PEBA), and the chain extender comprises pyromellitic dianhydride. As a further example, the polymer comprises polyamide, such as polyamide 12, or polyetherblockamide (PEBA), and the chain extender comprises styrene maleic anhydride. As a further example, the polymer comprises polyamide, such as polyamide 12, or polyetherblockamide (PEBA), and the chain extender comprises a styrene-acrylate copolymer containing reactive epoxy groups or e.g. Joncryl® ADR-4368C.

In a further exemplary embodiment, the polymer comprises thermoplastic polyester ether elastomer (TPEE) and the chain extender comprises a polymeric material containing epoxy groups. As a further example, the polymer comprises TPEE and the chain extender comprises pyromellitic dianhydride. As a further example, the polymer comprises TPEE and the chain extender comprises styrene maleic anhydride. As a further example, the polymer comprises TPEE and the chain extender comprises a styrene-acrylate copolymer containing reactive epoxy groups or e.g. Joncryl® ADR-4368C.

In a further aspect, the invention concerns a method for the manufacture of molded components, comprising loading pellets of an expanded polymer material into a mold, wherein the expanded polymer material of the pellets comprises an additive increasing the amorphous content of the polymer material; and connecting the pellets by heating the pellets to a temperature between a glass transition temperature and below the onset of melting of the expanded polymer material. The heating can be carried out as described above. An additive increasing the amorphous content of the polymer material modifies the polymer such that better connecting of the pellets in the mold is achieved. Such an additive can be a chain extender, without being restricted thereto.

The pellets used for manufacturing the molded components may be produced by using the above described methods using either a chain extender or an additive increasing the amorphous content of the polymer material, or a combination thereof. It is also possible to provide for two or more melting stages before expansion. It is also possible to add the blowing agent and chain extender or additive in two or more melting stages before expanding, e.g. melting the polymer, adding the chain extender or additive, then cooling, melting the polymer, and adding the blowing agent. Further possible is melting the polymer, adding a chain extender, then cooling, and repeating the process but with adding the blowing agent.

The chain extender may be added in an amount of 0.1 to 20% by weight, in particular 0.1 to 15% by weight, preferably 0.1 to 10% by weight, such as 0.1 to 5% by weight or 1 to 5% by weight, based on 100% by weight of the base polymer material. The same amounts may be used for an additive increasing the amorphous content of the polymer material.

Particularly suitable base polymer material are selected from polyamides and are, for instance, homopolyamide, copolyamide, polyetherblockamide, and polyphthalamide. Very suitable is, as an example, polyamide 12.

The chain extender may be a polymeric material containing epoxy groups, such as a styrene-acrylate copolymer containing reactive epoxy groups.

Figure 8A:
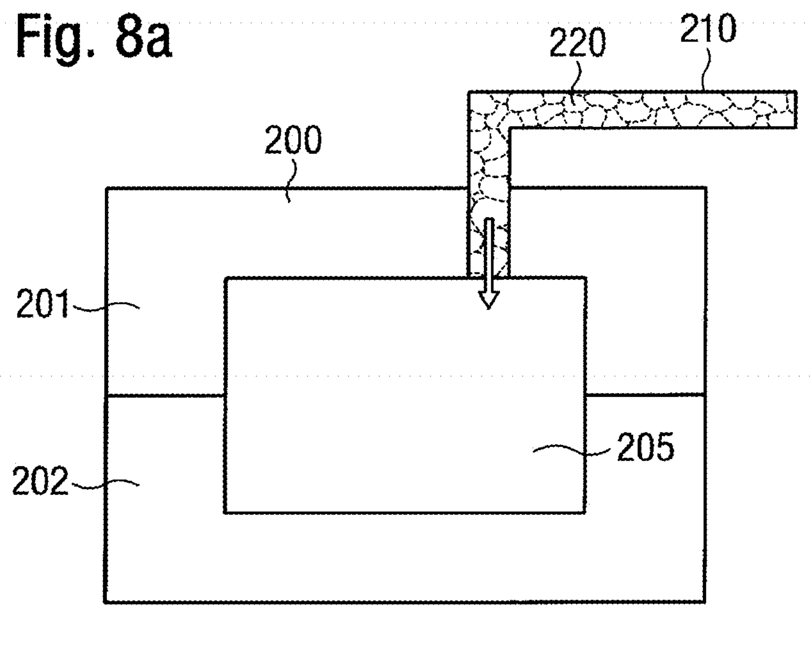
FIG. 8*a*: a mold when being filled with pellets of an expanded polymer material.
Figure 8B:
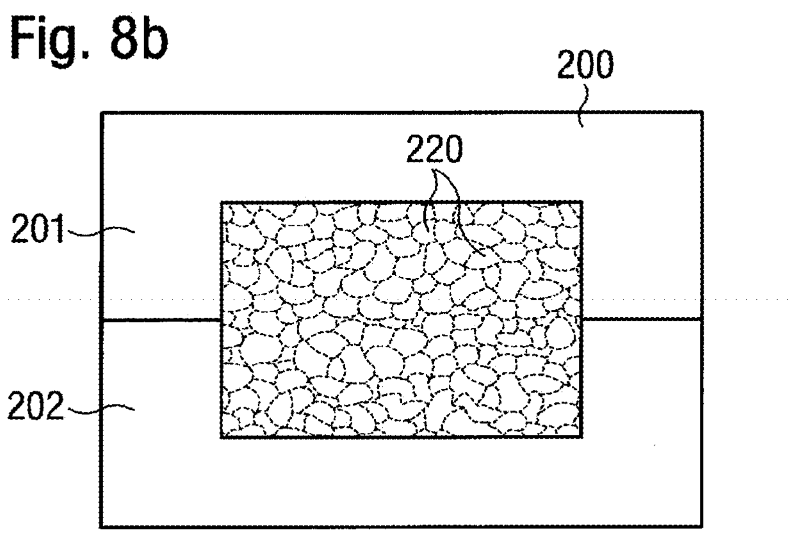
FIG. 8*b*: the mold of FIG. 8*b* when filled with pellets of an expanded polymer material.
Figure 8C:
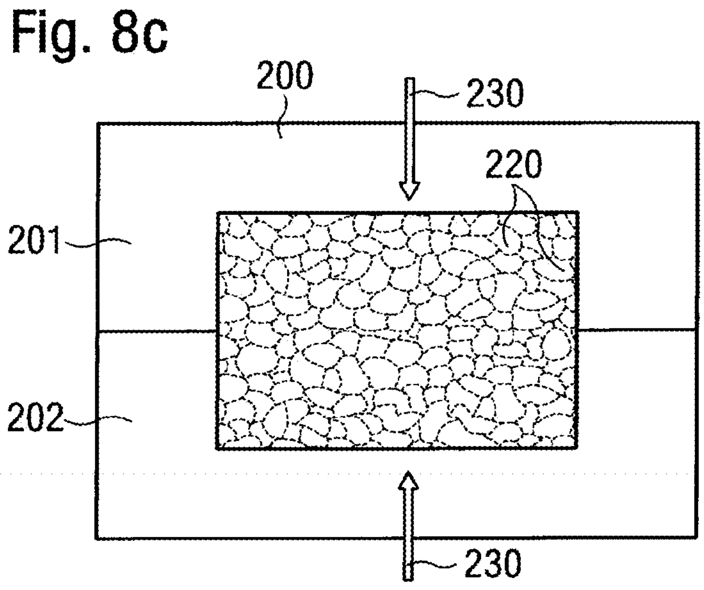
FIG. 8*c*: the mold of FIG. 8*c* when heat energy is applied to the pellets.

FIGS. 8*a*, 8*b* and 8*c* show a mold which can be used to conduct the method for the manufacture of molded components according to the second aspect of the invention. FIG. 8*a* shows a mold, generally designated with reference numeral 200 and comprising two parts 201 and 202. The mold 200 comprises a cavity 205 which is filled with pellets 220 via a supply tube 210. FIG. 8*b* shows when the cavity 205 is completely filled with pellets 220. FIG. 8*c* shows the application of heat energy 230 on the pellets 220, in order to connect the pellets. After having connected the pellets, the mold 200 can be opened via parts 201 and 202 to release the molded component (not shown).

Molded components can be manufactured in a molding from the pellets of the expanded polymer material using steam-chest molding. This technology as well as steam-chest molding machines are known in the art. Such steam-chest molding machines are commercially available, e.g. from the company Kurtz GmbH (Germany). In this process, first the pellets are fed into the mold. After closing the mold, the pellets are subjected to steam pressure. The conditions used for steam pressure and temperature are dependent on the material of the pellets used (polymer material, chain extender, additive). These conditions can be determined by the person skilled in the art using routine experiments. The temperature can be chosen such as to be, on the one hand, above the glass transition temperature of the polymer material to allow additional mobility of the amorphous regions in the polymer and, on the other hand, below the onset of melting of the polymer material so that the foamed pellets do not begin to melt and ultimately collapse. As an example, the molding can be conducted using a steaming profile with a ramping the pressure/temperature up and down for a predetermined time of duration. The skilled person can determine suitable pressure, temperature, and time/cycle conditions by balancing e.g. pressure and time. If the pressure is too high, the pellets can collapse and melt. If the time is too short, the pellets will not receive enough energy and may not fuse correctly. It is also possible to use the melting material of the polymer material to create fusion, for example, for expanded polypropylene having double melting peak with fusion occurring between melting peaks.

It is possible that the pellets of the expanded material have internally an at least partially ruptured foam structure.

If the article is produced using pellets of the expanded material that may have internally an at least partially ruptured foam structure, the molded component produced is suitable for e.g. sound insulation.

The molded components produced may be used as or be suitable as at least one of the following: a packaging material, a reusable packaging material, a pallet, an article for medical transportation, an article for chemical transportation, an article for breakable goods transportation, an article for interior insulation, an article for exterior insulation, an article for pipe insulation, a geofoam, a temporary housing, a road crash protection, an article for appliance insulation, an article for industrial appliance insulation, a sun visor, a dash board, a car seat, a center console, a car door, a child/baby seat, an article for battery cover/insulation, an article for engine insulation, a bumper, a crash structure, a protective helmet, an article of protective clothing, a boat fender, a medical stretcher, a surf/rescue board, a buoy, a boat hull, a snowmobile seat, a core for skis/snowboards/water skis/wakeboards, a jet ski seat, an artificial turf, a venue or playground flooring, a sports hall protective flooring/wall, a conditioning roller, a resistance weight for aerobics, a swimming aid, an article of furniture, a bean bag, a cow mat, a drone, an article of luggage, a plane seat, a plane/glider wing, an article for aeroplane cabin insulation, a plane food tray, an article for airline food trolley insulation, an under floor, an article for heating protection, an article of advanced protective equipment, a medical cast, a turbine/rotor blade core, a run-flat tyre, hand grips, beverage insulation, lamp covers, mattresses.

The molded components produced may be used as or be suitable as an article, in the production of cushioning elements for sports apparel, in particular for the production of soles for shoes, preferably midsoles.

Figure 10:
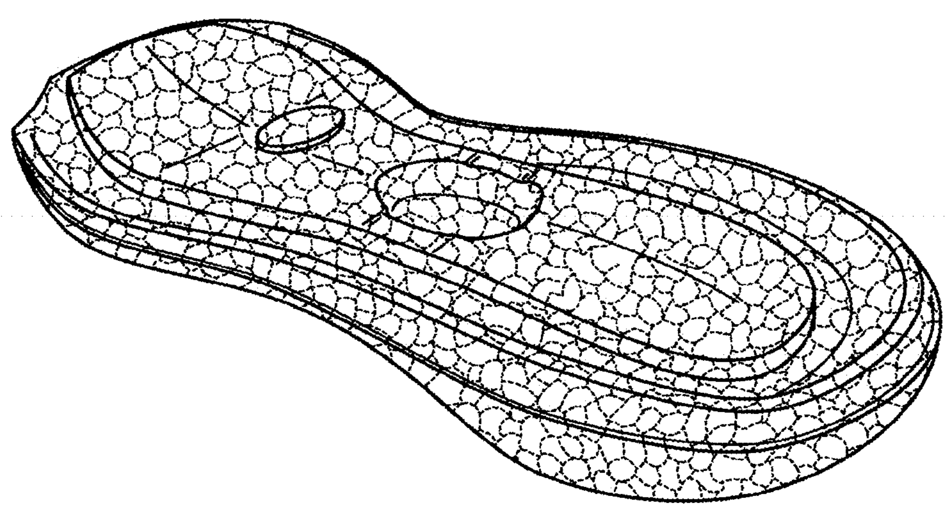
FIG. 10: a midsole produced by fusing expanded polyetherblockamide pellets with chain extender (CE).
Figures 12, 13:
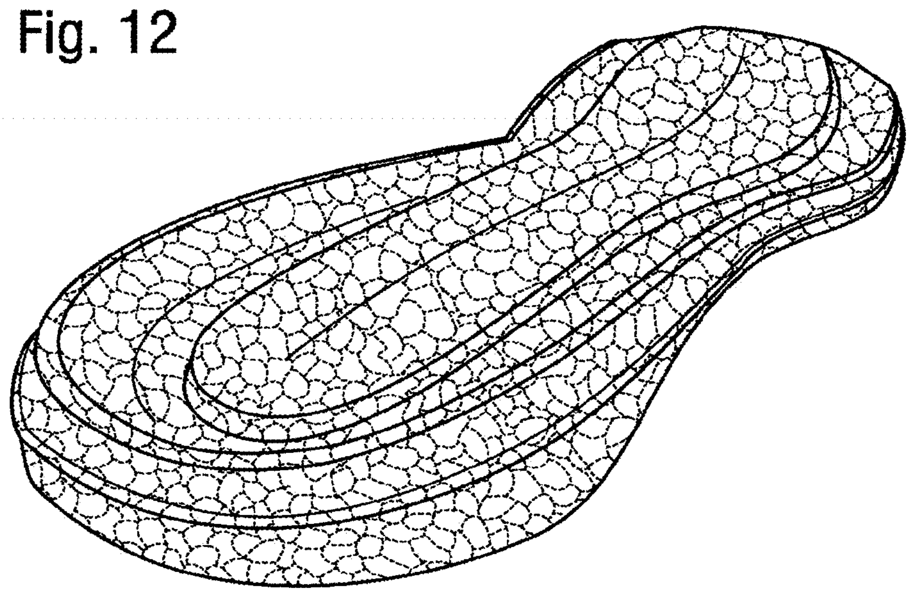
FIG. 12: a midsole produced by fusing expanded polyetherblockamide pellets with chain extender (CE).
FIG. 13: a diagram representing heat flow versus temperature for expanded polybutylene terephthalate (PBT) pellets with different amounts of chain extender (CE).

An aspect of the invention concerns a shoe, in particular a shoe comprising a cushioning element. The cushioning element may be a sole, in particular a midsole. Suitable midsoles may be produced e.g. by fusing expanded polyetherblockamide pellets containing chain extender. Such midsoles are shown in FIG. 10 and FIG. 12 and further described in Examples 3 and 4 below.

Another aspect of the invention concerns an article comprising a foam. The foam can be produced by fusing or connecting expanded polymer pellets using the methods described above. The article may be sport apparel, for example a shoe, such as a sports shoe. The shoe may comprise the foam in form of a cushioning element, e.g. as sole or midsole.

Figure 16:
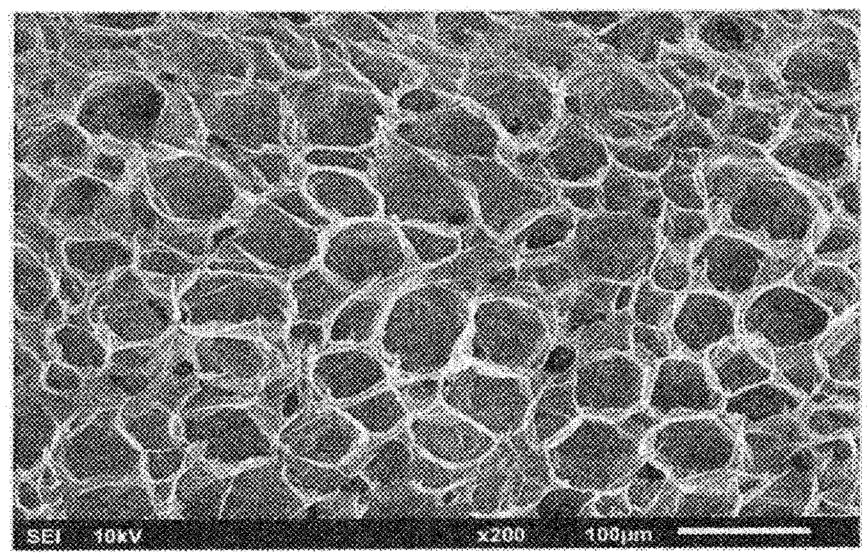
FIG. 16: a scanning electron microscopy (SEM) image of expanded polyamide (PA12) pellets/beads.
Figure 17:
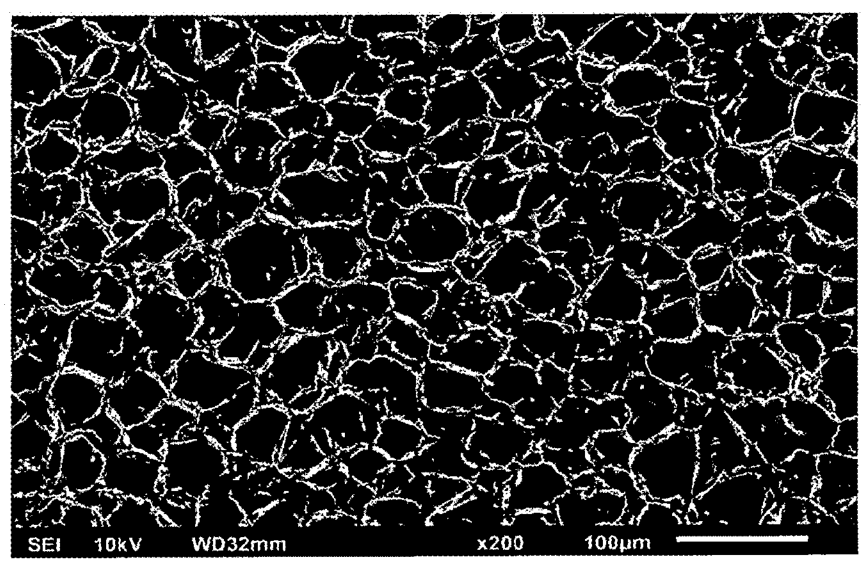
FIG. 17: a scanning electron microscopy (SEM) image of expanded polyamide (PA12) pellets/beads comprising chain extender (CE).

The molded components also may be used for sound insulation. Suitable molded components are in particular foams with open cell configuration. As an example, the expanded pellets, and thus the fused foam may have an at least partially ruptured structure. Pellets or fused foams suitable for producing sound insulation articles may be produced e.g. from polyamide, such as polyamide 12. The polyamide may contain a chain extender. Such expanded pellets are shown in FIGS. 16 and 17. FIG. 16 shows a scanning electron microscopy (SEM) image of expanded polyamide (PA12) pellets without (i.e. 0%) chain extender. FIG. 17 shows a scanning electron microscopy (SEM) image of expanded polyamide (PA12) pellets comprising 1.5% chain extender. The enlargement scale in those figures is 200-times of a distance of 100 μm as shown. Those figures show that the cells rupture when increasing the percentage of chain extender.

EXAMPLES

The invention is illustrated by means of the following examples that show embodiments but do not limit the invention.

Example 1

As base polymer, a polyamide 12 material was used. The polyamide 12 used was Vestamid LX 9012 obtainable from Evonik Industries AG, Marl. As blowing agent, a combination of 4% by weight of (supercritical) carbon dioxide and 3% by weight of ethanol, based on 100% by weight of the base polymer, was used.

The base polymer and blowing agent were fed to the twin screw extruder 2 according to the setup shown in FIG. 1, wherein the reference signs designate the same as in the discussion of FIG. 1 above. In the extruder 2, the polymer introduced via hopper 4 was melted and mixed with the injected blowing agent 5. The temperature profile in the extruder 2 was in the range of from 170 to 220° C. In the cooling extruder 9, the polymer melt was further mixed with the blowing agent and cooled. The mass temperature in the extruder 9 was 170° C. Subsequently, the molten polymer was expanded through a round die 11 at a pressure of 220 bar, resulting in an expanded extrudate 12 in strand form. Thereafter, the expanded extrudate 12 was fed to an underwater pelletizing device as shown in FIG. 2. The temperature in the water circulation system of the underwater pelletizer was 70° C. The pellets obtained were dried after underwater pelletizing, and prior to density measurements. They had a density of 89 kg/$m^3$.

The pellets were investigated by means of DMA (dynamic mechanical analysis) to evaluate the storage modulus at different temperatures, and further by scanning electron microscopy (SEM).

Figures 4, 5A:
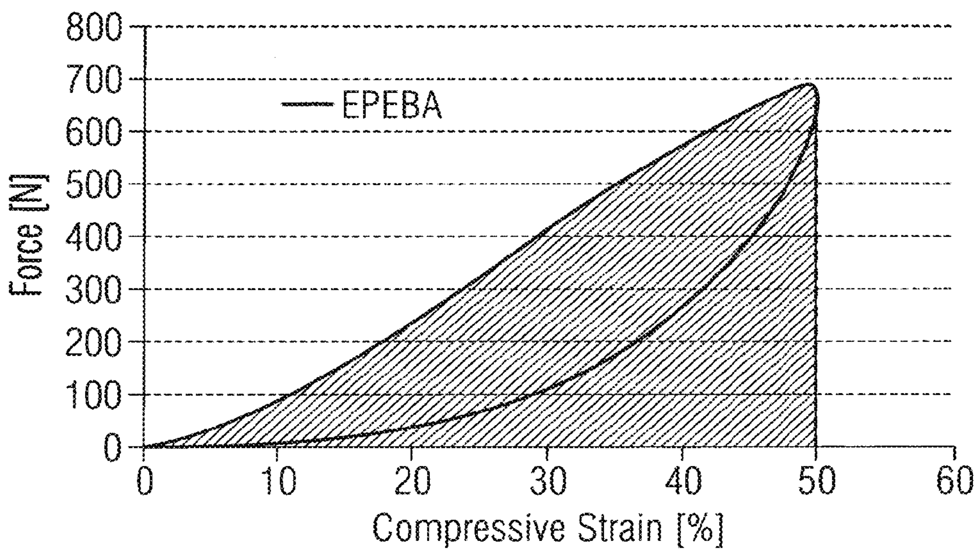
FIG. 4: a diagram representing storage modulus versus temperature for an expanded polyamide pellet as produced in Example 1 (ePA12) and a comparative expanded polypropylene (ePP)
FIG. 5*a*: a diagram representing a hysteresis loop for a test plate made from expanded polyetherblockamide pellets as produced in Example 2, wherein the area under the compression branch of the hysteresis loop is hatched.

For DMA, a known test apparatus was used and a storage modulus analysis was carried out with a −40° C. to +40° C. temperature sweep under the following test conditions: 5° C. increments; 5 min soak time at each temperature; 25% initial compression strain; 5% sinusoidal oscillation around initial strain; and 1 Hz oscillation. The pellets tested had substantially spherical shape with approximately 5 mm diameter. The results obtained are shown in FIG. 4 showing the storage modulus (in kPa) versus the temperature (in ° C.) for EPA12. For comparison, measurements of a foamed polypropylene (Neopolen P9230K of BASF; EPP) having spherical shape with approximately 4-5 mm diameter and similar stiffness properties are further shown in FIG. 4.

As is evident from that figure, the polyamide pellets EPA12 show a variation of approx. 35%, more precisely a decrease by approx. 35% in storage modulus when changing the temperature from −40° C. to +40° C., compared to the expanded polypropylene particles EPP with approx. 288% decrease in storage modulus.

Figure 6:
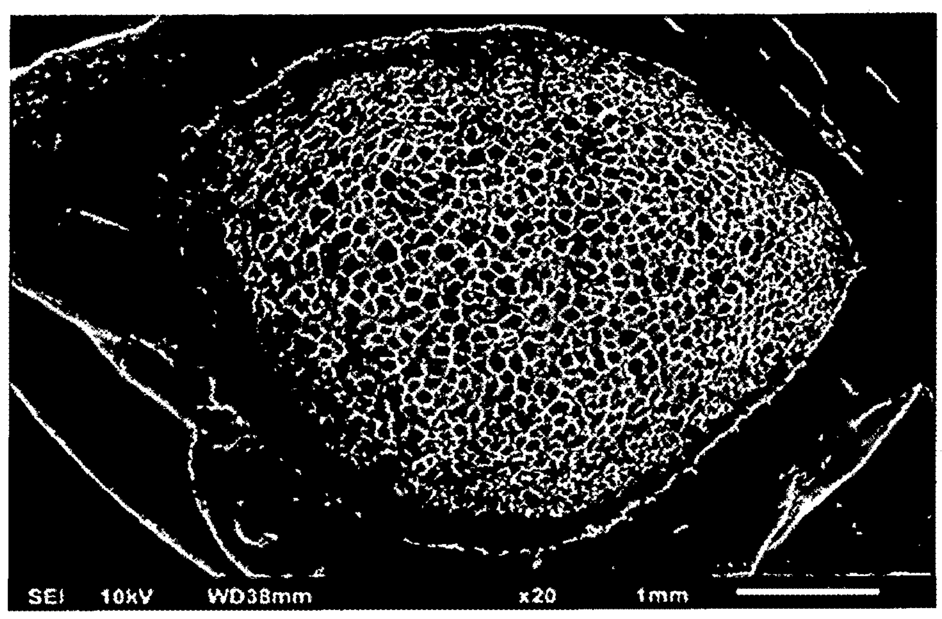
FIG. 6: a scanning electron microscopy (SEM) image of an expanded polyamide pellet as produced in Example 1.

In FIG. 6, a scanning electron microscopy (SEM) image of the expanded polyamide pellet is shown. The enlargement scale is 20-times of a distance of 1 mm as shown. The image shows that the pellets have closed particle skin and uniform cell sizes, thus, providing an excellent foam structure in particle form.

Example 2

As base polymer, a PEBA material was used. The used PEBA material was Vestamid E62-S3 obtainable from Evonik Industries AG, Marl. According to supplier's information the number following the letter E indicates the Shore D hardness according to ISO 868, meaning that Vestamid E62-S3 comprises a Shore D hardness of 62. As blowing agent, a combination of 4% by weight of (supercritical) carbon dioxide and 2% by weight of ethanol, based on 100% by weight of the base polymer, was used. Further, a chain extender based on styrene-acrylate copolymer was used. The chain extender was Joncryl® ADR-4368C of BASF which was used in an amount of 2% by weight, based on 100% by weight of the base polymer.

The base polymer, blowing agent and chain extender were fed to the twin screw extruder 2 according to the setup shown in FIG. 1, wherein the reference signs designate the same as in the discussion of FIG. 1 above. In the extruder 2, the polymer introduced via hopper 4 was melted and mixed with the injected blowing agent 5 and the chain extender. The chain extender was introduced with the polymer as a dry blend in the hopper. The temperature profile in the extruder 2 was in the range of from 170 to 220° C. In the cooling extruder 9, the polymer melt was further mixed with the blowing agent and chain extender, and cooled. The mass temperature in the extruder 9 was 158° C. Subsequently, the molten polymer was expanded through a round die 11 at a pressure of 200 bar, resulting in an expanded extrudate 12 in strand form. Thereafter, the expanded extrudate 12 was fed to an underwater pelletizing device as shown in FIG. 2. The temperature in the water circulation system of the underwater pelletizer was 70° C. The pellets obtained were dried after underwater pelletizing, and prior to density measurements. They had a density of 70 kg/$m^3$ and were investigated by scanning electron microscopy (SEM).

Further, for evaluating mechanical properties, the pellets were bonded together via steam to produce a test plate. The test plate had a density of approx. 84 kg/$m^3$ and was tested with regard to its compression behavior.

Figure 5B:
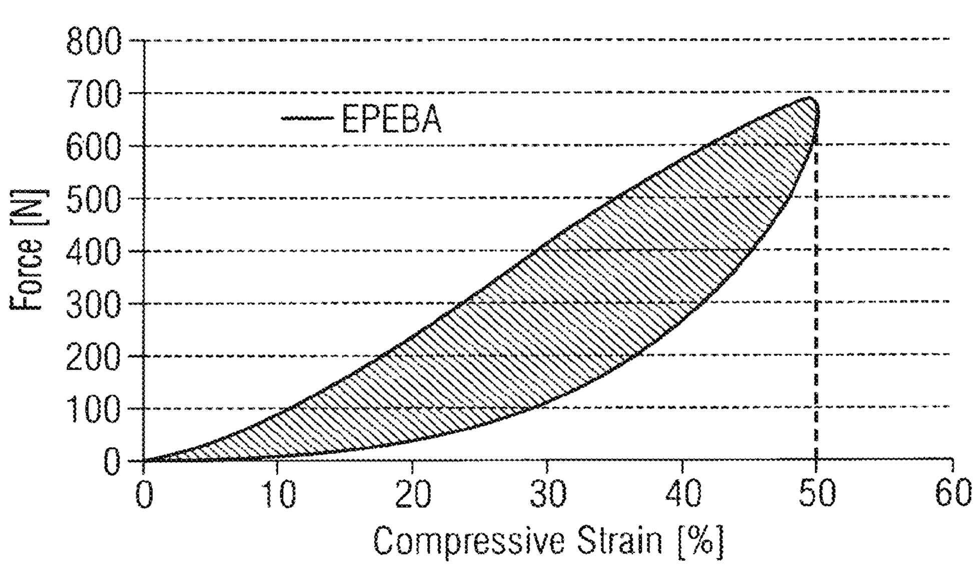
FIG. 5*b*: the diagram of FIG. 5*a*, wherein the area within the hysteresis loop is hatched.
Figure 5C:
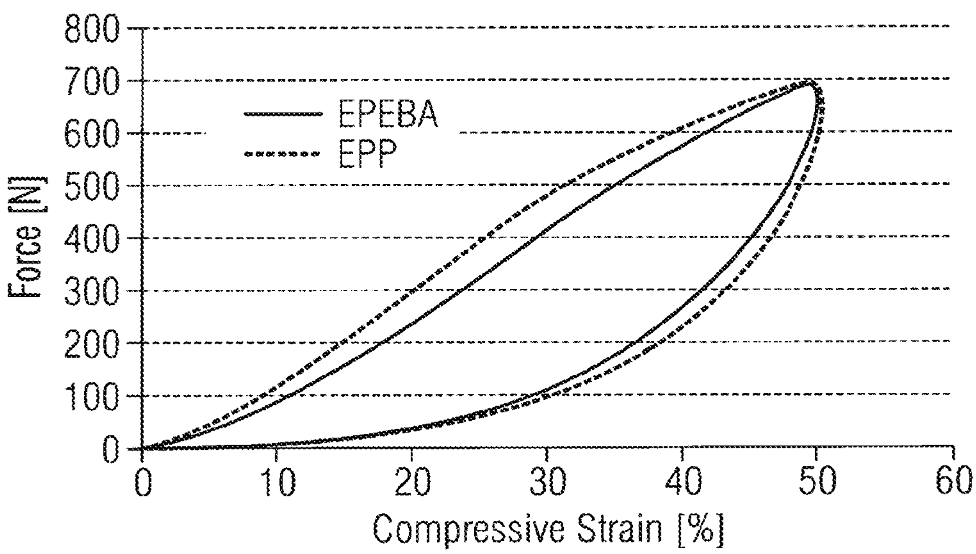
FIG. 5*c*: a diagram representing the hysteresis loop for the test plate made from the expanded polyetherblockamide pellets produced in Example 2 (ePEBA) in comparison with a test plate made of expanded polypropylene (ePP)

The compression testing was carried out using a known testing apparatus at 23° C. under the following test conditions: 20 mm thick sample; 50% compression; heel stamp (diameter of 50 mm); speed of 50 mm/min; and 5N pre-load. The results obtained are shown in FIGS. 5*a*, 5*b* and 5*c*. For comparison, measurements of a similar test plate made from foamed polypropylene (Neopolen P9230K of BASF; EPP) having similar stiffness properties are shown in FIG. 5*c*.

The diagram in FIG. 5*a* shows the hysteresis loop for the first cycle for the test plate made from the expanded polyetherblockamide pellets, wherein the total energy exerted during compression of the test plate is hatched. The diagram of FIG. 5*b* shows the same diagram as FIG. 5*a*, however, with the area within the hysteresis loop being hatched. Form the hatched areas in FIG. 5*b* and FIG. 5*a*, the relative energy loss in % during one full hysteresis cycle can be calculated by dividing the area hatched in FIG. 5*b* by the area hatched in FIG. 5*a*. The relative energy loss during the first hysteresis cycle for the test plate made from the expanded pellets of the present example was approximately 57%. Further test cycles were conducted, wherein in the tenth cycle the relative energy loss was approximately 31%.

The diagram of FIG. 5*c* shows the hysteresis loop for the test plate made from the expanded polyetherblockamide pellets (ePEBA), in comparison with a test plate made from expanded polypropylene pellets (ePP). The values show that the ePEBA test plate demonstrates good mechanical properties during compression up to 50% compressive strain (displacement) with good recovery (low plastic deformation) and low hysteresis, thus improved compression properties when compared with the ePP plate.

Figure 7:
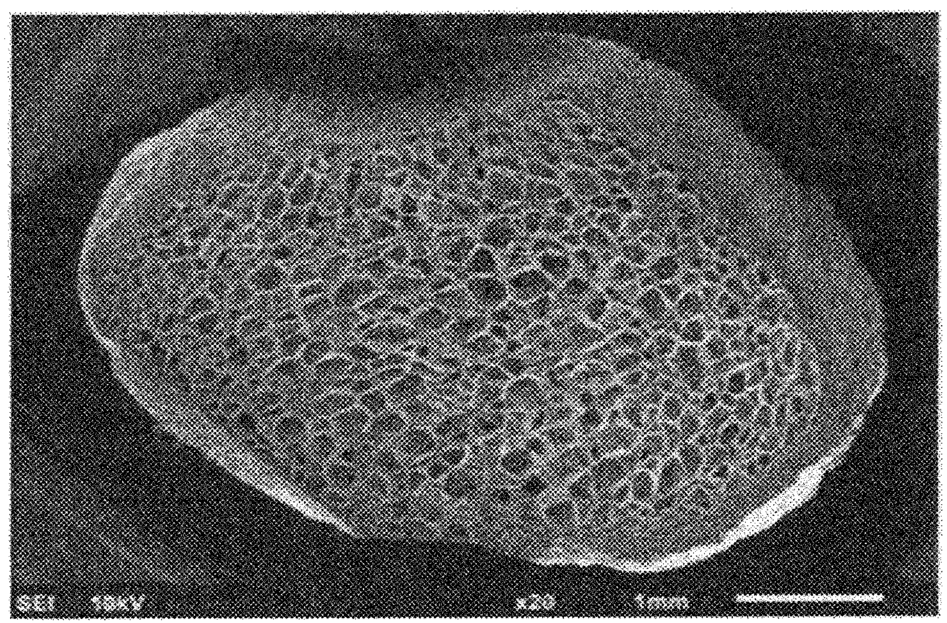
FIG. 7: a scanning electron microscopy (SEM) image of an expanded polyetherblockamide pellet as produced in Example 2.

In FIG. 7, a scanning electron microscopy (SEM) image of the expanded polyetherblockamide pellet is shown. The enlargement scale is 20-times of a distance of 1 mm as shown. The image shows that the pellets have closed particle skin and uniform cell sizes, thus, providing an excellent foam structure in particle form.

Example 3

As base polymer, a PEBA material was used. The used PEBA material was Vestamid E62-S3 obtainable from Evonik Industries AG, Marl. Further, a chain extender based on styrene-acrylate copolymer, namely Joncryl® ADR-4368C (BASF) was used in amounts of 1% by weight, 2% by weight, and 2.5% by weight, based on 100% by weight of the base polymer. For comparison, the base polymer was also tested without chain extender. The polymer together with the same blowing agents as described in Example 2 and the indicated amount of chain extender were melted in an extruder, similar to Example 2. Subsequently, similar to Example 2, the melt was expanded through a round die and fed to an underwater pelletizing device to obtain expanded pellets.

Figure 9:
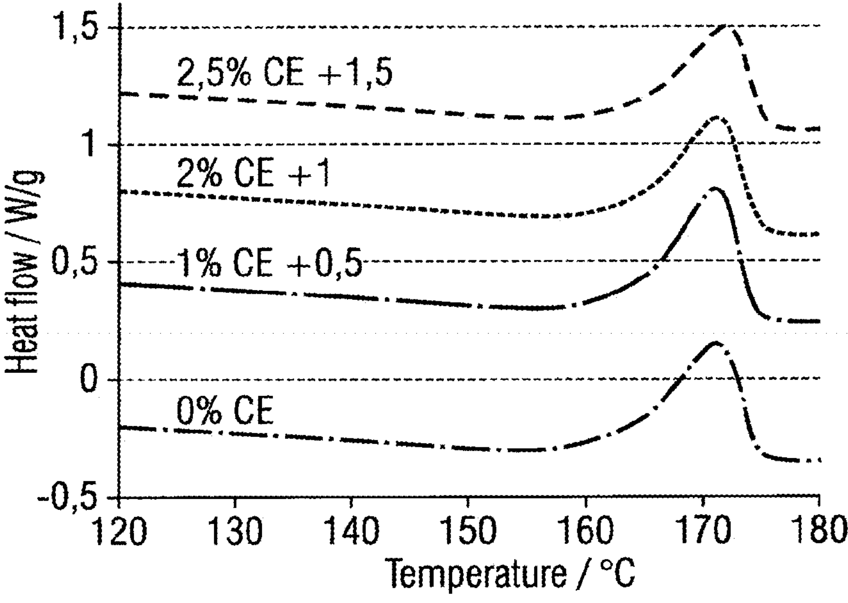
FIG. 9: a diagram representing heat flow versus temperature for expanded polyetherblockamide pellets with different amounts of chain extender (CE).

The pellets (before molding) were tested on their heat flow-temperature behavior via DSC measurement using a heating rate of 10K/min for a temperature range of from 25° C. to 250° C. The test results obtained are shown FIG. 9, wherein the data from the first heating of the DSC measurement were used. In FIG. 9, the designations of the curves indicate the amount of chain extender and, if, the offset of the curve compared to zero. The curves have an indicated offset of 0.5, 1, and 1.5, respectively, for better comparison. As can be seen, neither the peak nor the width of the curve is affected by the chain extender. However, the height of the peak is affected in that the height is decreasing with increasing amount of chain extender. That means that the crystallinity of the polymer decreases with increasing amount of chain extender.

The pellets containing 2.5% by weight of chain extender were loaded into a mold and fused by providing steam into the mold. The mold was a tool for molding midsoles for shoes. FIG. 10 shows an image of the midsole obtained after molding.

Example 4

As base polymer, a PEBA material was used. The used PEBA material was Vestamid E55 obtainable from Evonik Industries AG, Marl. A chain extender based on styrene-acrylate copolymer, namely Joncryl® ADR-4368C (BASF), was used in amounts of 3% by weight, 4.5% by weight, and 5% by weight, based on 100% by weight of the base polymer. For comparison, the base polymer was also tested without chain extender. The polymer together with the same blowing agents as described in Example 2 and the indicated amount of chain extender were melted in an extruder, similar to Example 2. Subsequently, similar to Example 2, the melt was expanded through a round die and fed to an underwater pelletizing device to obtain expanded pellets.

Figure 11:
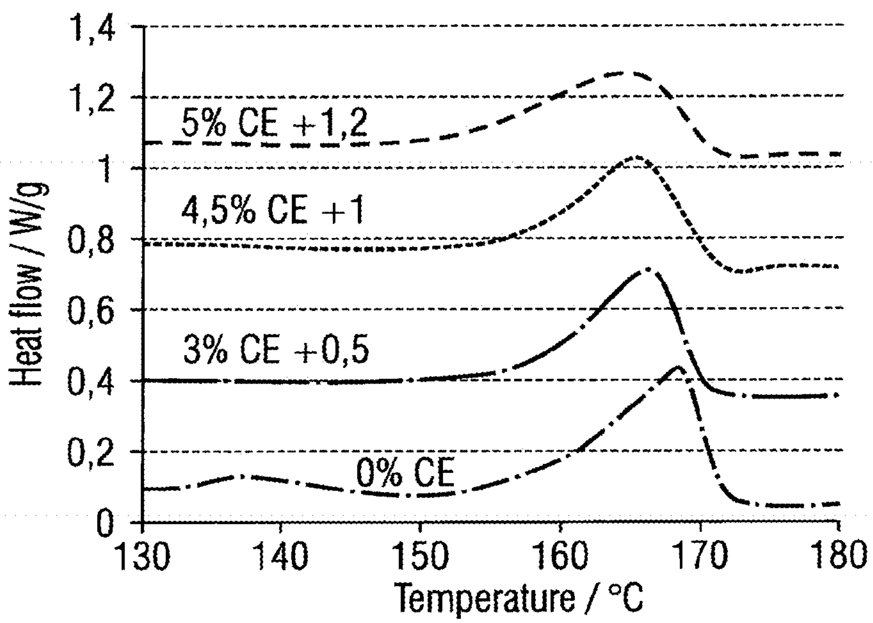
FIG. 11: a diagram representing heat flow versus temperature for expanded polyetherblockamide pellets with different amounts of chain extender (CE).

The pellets (before molding) were tested on their heat flow-temperature behavior via DSC measurement using a heating rate of 10K/min for a temperature range of from 25° C. to 250° C. The test results obtained are shown FIG. 11, wherein the data from the first heating of the DSC measurement were used. In FIG. 11, the designations of the curves indicate the amount of chain extender and, if, the offset of the curve compared to zero. The curves have an indicated offset of 0.5, 1, and 1.2, respectively, for better comparison. As can be seen, the height of the peak is affected in that the height is decreasing with increasing amount of chain extender. That means that the crystallinity of the polymer decreases with increasing amount of chain extender.

The pellets containing 5% by weight of chain extender were loaded into a mold and fused by providing steam into the mold. The mold was a tool for molding midsoles for shoes. FIG. 12 shows an image of the midsole obtained after molding.

Example 5

As base polymer, a polybutylene terephthalate (PBT) material was used. The used PBT material was Ultradur B4520 obtainable from BASF. A chain extender based on styrene-acrylate copolymer, namely Joncryl® ADR-4368C (BASF), was used in amounts of 1% by weight and 1.5% by weight, based on 100% by weight of the base polymer. For comparison, the base polymer was also tested without chain extender. A compact material was formed, wherein the process included melting of the polymer, adding the chain extender and extrusion of the resulting material. Subsequently, the compact material was cooled and the material's heat flow-temperature behavior was measured using DSC using a heating rate of 10K/min for a temperature range of from 25° C. to 250° C. The test results obtained are shown FIG. 13, wherein the data from the first heating of the DSC measurement were used. In FIG. 13, the designations of the curves indicate the amount of chain extender and, if, the offset of the curve compared to zero. The curves have an indicated offset of 1 and 2, respectively, for better comparison. As can be seen, the peak of the curve is affected by the chain extender in its height. The height of the peak is decreasing with increasing amount of chain extender. That means that the crystallinity of the polymer decreases with increasing amount of chain extender.

Example 6

Figure 14:
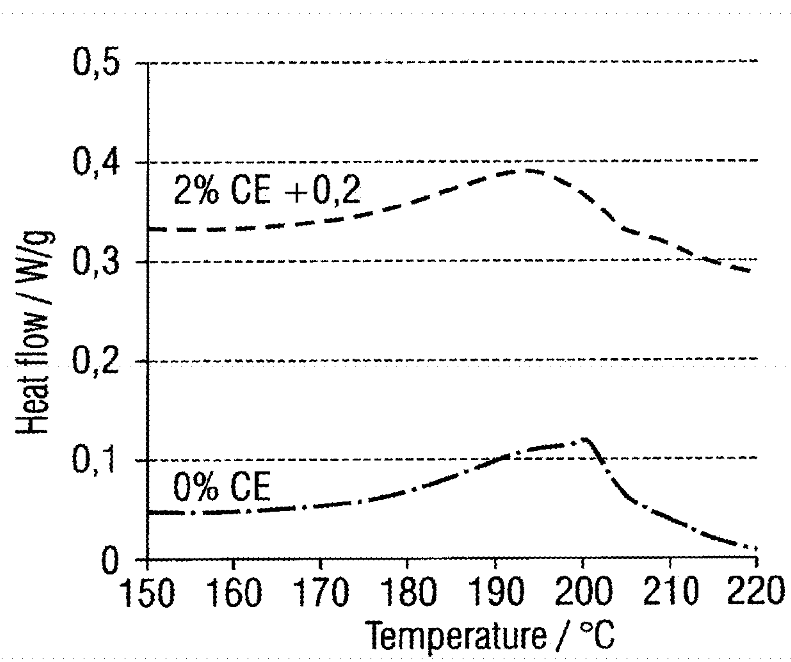
FIG. 14: a diagram representing heat flow versus temperature for expanded thermoplastic polyester ether elastomer (TPEE) pellets with and without chain extender (CE).
Figure 15:
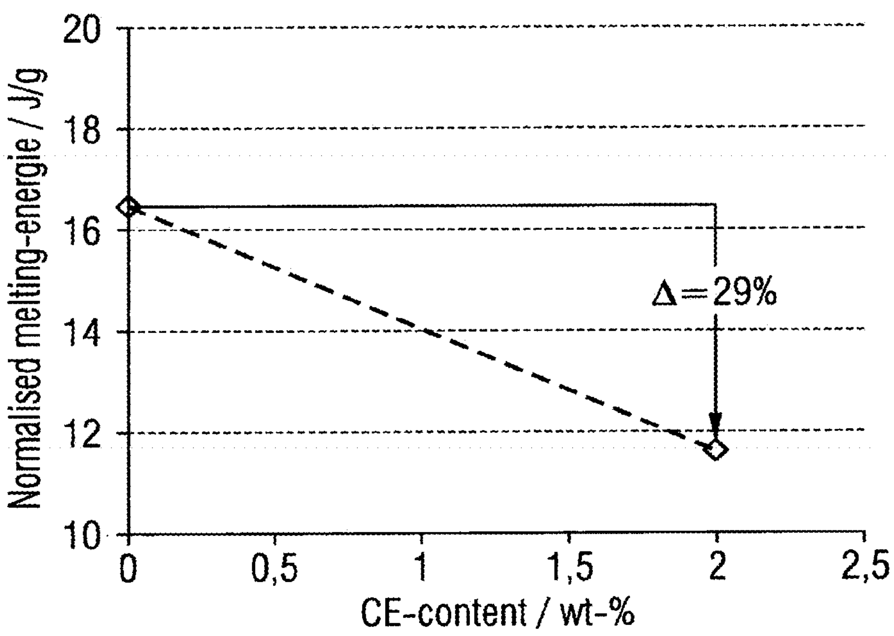
FIG. 15: a diagram representing normalized melting energy versus content of chain extender (CE) for expanded thermoplastic polyester ether elastomer (TPEE) pellets with and without chain extender (CE).

As base polymer, a TPEE material was used. The used TPEE material was Arnitel EM400 obtainable from DSM. A chain extender based on styrene-acrylate copolymer, namely Joncryl® ADR-4368C (BASF), was used in an amount of 2% by weight, based on 100% by weight of the base polymer. For comparison, the base polymer was also tested without chain extender. A compact material was formed, wherein the process included melting of the polymer, adding the chain extender and extrusion of the resulting material. Subsequently, the compact material was cooled and the material's heat flow-temperature behavior was measured using DSC using a heating rate of 10K/min for a temperature range of from 25° C. to 250° C. The test results obtained are shown in FIG. 14 and FIG. 15, wherein the data from the first heating of the DSC measurement were used. In FIG. 14, the designations of the curves indicate the amount of chain extender and, if, the offset of the curve compared to zero. One curve has an indicated offset of 0.2, for better comparison. As can be seen, the peak of the curve is affected by the chain extender in its height. The height of the peak is decreasing with the presence of chain extender. That means that the crystallinity of the polymer decreases with addition of a chain extender. Further, the curve is smoother when chain extender has been added.

FIG. 15 shows that the melting energy (normalized) significantly decreases by 29% when adding chain extender in an amount of 2% by weight. This illustrates the change in crystallinity due to chain extender addition. The same tendency would be seen when plotting the results of expanded PEBA of Example 4 above (FIG. 11) and of expanded PBT of Example 5 above in the same manner as in FIG. 15 (normalizing melting energy and plotting against chain extender content).

Example 7

As base polymer, a polyamide 12 (PA12) material was used. The polyamide 12 used was Vestamid LX 9012

(obtainable from Evonik Industries AG, Marl). As blowing agent, a combination of 4% by weight of (supercritical) carbon dioxide and 3% by weight of ethanol, based on 100% by weight of the base polymer, was used. A chain extender based on styrene-acrylate copolymer, namely Joncryl® ADR-4368C (BASF), was used in the amount of 1.5% by weight, based on 100% by weight of the base polymer, and without chain extender.

The polymer together with the same blowing agent and the indicated amount of chain extender were melted in an extruder, similar to Example 1. Subsequently, similar to Example 1 the melt was expanded through a round die and fed to an underwater pelletizing device to obtain expanded pellets.

In FIGS. 16 and 17, scanning electron microscopy (SEM) images of the expanded polyamide pellets are shown. FIG. 16 shows the pellets without (0%) chain extender, FIG. 17 with 1.5% chain extender. The enlargement scale in those figures is 200-times of a distance of 100 μm as shown. The images show that the pellets have partially ruptured foam structure, shown by the ruptures in the cell walls which increases with the amount of chain extender, thus providing an excellent foam structure for sound insulation.

The invention claimed is:

1. A method for producing expanded polymer pellets, the method comprising:

melting a polymer comprising a polyamide to form a polymer melt, wherein the polyamide comprises a polyamide 12;

adding at least one blowing agent to the polymer melt via an injection device;

expanding the polymer melt through an extruder and a die faceplate to produce an expanded polymer, wherein the die faceplate comprises a hole, wherein a diameter of the hole ranges from 2.3 mm to 2.6 mm; and pelletizing the expanded polymer to form the expanded polymer pellets;

wherein the expanded polymer pellets have a density from 20 to 400 $kg/m^3$ and a variation of less than 50% in their storage modulus in the temperature range of −40° C. to 40° C.

2. The method of claim 1, wherein the polymer melt further comprises at least one of flame inhibitors, plasticizers, reinforcing agents, pigments, dyes, heat- or light-stabilizers, antistatic agents, fillers, and mixtures thereof.

3. The method of claim 1, wherein the blowing agent comprises nitrogen, carbon dioxide, ethanol, isopropanol, or mixtures thereof.

4. The method of claim 1, wherein the blowing agent is added to the polymer melt, the polymer melt is cooled, and then the polymer melt is extruded.

5. The method of claim 1, wherein the blowing agent is added to the polymer melt in the extruder.

6. The method of claim 1, wherein the extruder has a die through which the polymer melt is expanded.

7. The method of claim 1, wherein the expanded polymer pellets have a variation of less than 40% in their storage modulus in the temperature range of −40° C. to 40° C.

8. The method of claim 1, wherein the expanded polymer pellets have a variation from 30 to 40% in their storage modulus in the temperature range of −40° C. to 40° C.

9. The method of claim 1, wherein a density of the expanded polymer pellets is from 50 to 300 $kg/m^3$.

10. The method of claim 1, wherein a density of the expanded polymer pellets is from 70 to 100 $kg/m^3$.

11. The method of claim 1, wherein two extruders are used in series.

12. The method of claim 11, wherein a first extruder is a twin screw extruder and a second extruder is a single screw extruder.

13. The method of claim 1, wherein the extruder is operated at a temperature at which the polymer material is completely melted.

14. A method for producing expanded polymer pellets, the method comprising:

melting a polymer comprising a polyamide to form a polymer melt, wherein the polyamide comprises a polyamide 12;

adding at least one blowing agent to the polymer melt via an injection device;

expanding the polymer melt through two extruders in series to produce an expanded polymer; and pelletizing the expanded polymer to form the expanded polymer pellets;

wherein the expanded polymer pellets have a density from 20 to 400 $kg/m^3$ and a variation of less than 50% in their storage modulus in the temperature range of −40° C. to 40° C.

15. The method of claim 14, wherein the polymer melt further comprises at least one of flame inhibitors, plasticizers, reinforcing agents, pigments, dyes, heat- or light-stabilizers, antistatic agents, fillers, and mixtures thereof.

16. The method of claim 14, wherein a density of the expanded polymer pellets is from 50 to 300 $kg/m^3$.

17. The method of claim 14, wherein a density of the expanded polymer pellets is from 70 to 100 $kg/m^3$.

18. The method of claim 14, wherein a first extruder is a twin screw extruder and a second extruder is a single screw extruder.

19. The method of claim 14, wherein a first extruder is operated at a temperature at which the polymer material is completely melted.

* * * * *